United States Patent [19]
Quinn et al.

[11] Patent Number: 5,751,578
[45] Date of Patent: May 12, 1998

[54] PLATFORM ATTITUDE MEASUREMENT SYSTEM

[75] Inventors: James P. Quinn, Gurnee; Lance D. Gedde, McHenry, both of Ill.

[73] Assignee: Recon/Optical, Inc., Barrington, Ill.

[21] Appl. No.: 442,011

[22] Filed: May 16, 1995

[51] Int. Cl.$^6$ .................................................. B64C 17/00
[52] U.S. Cl. .......................... 364/453; 248/550; 318/649
[58] Field of Search ................................ 364/453, 454, 364/456, 566; 248/550; 318/648, 649

[56] References Cited

U.S. PATENT DOCUMENTS

| 4,033,541 | 7/1977 | Malueg | 248/550 |
| 4,052,654 | 10/1977 | Kramer et al. | 318/649 |
| 5,067,084 | 11/1991 | Kau | 364/453 |
| 5,075,861 | 12/1991 | Hasson et al. | 364/453 |
| 5,124,938 | 6/1992 | Algrain | 364/566 |
| 5,169,090 | 12/1992 | Wright et al. | 244/175 |
| 5,172,323 | 12/1992 | Schmidt | 364/453 |

*Primary Examiner*—Gary Chin
*Attorney, Agent, or Firm*—McDonnell, Boehnen, Hulbert & Berghoff

[57] ABSTRACT

A system for measuring the attitude of the platform that is movable relative to a fixed frame. The system comprises at least three platform mounting assemblies, each of the three mounting assemblies comprising (a) an isolation mount interconnecting the platform to the frame, the isolation mount permitting the platform to move relative to the frame, and (b) a means for measuring the movement of a point on the platform relative to the frame along three orthogonal axes. For each of the three mounting assemblies, the means for measuring, in the preferred embodiment, comprise a set of three linear position sensors having a known fixed attachment point to the frame and an end portion that terminates at or about the point on the platform. The linear position sensors or potentiometers generate measurement signals corresponding to the measurements of platform movement. The system further comprises a data processor that receives the measurement signals and responsively calculates the attitude of the platform relative to the frame according to a procedure set forth in detail.

In an embodiment of the invention wherein the platform includes an aerial reconnaissance camera system, and the platform is mounted to a portion of the aircraft frame. The data processor obtains from the aircraft's inertial navigation system current information as to roll, pitch and yaw of the aircraft and sums the calculated yaw, pitch and roll angles with aircraft roll, pitch and yaw information derived from an inertial navigation system. Thus, the data processor derives the attitude of the platform in an inertial frame of reference and corrects for platform movement caused by the passive isolation mounts, permitting precise pointing of the aerial reconnaissance camera.

18 Claims, 17 Drawing Sheets

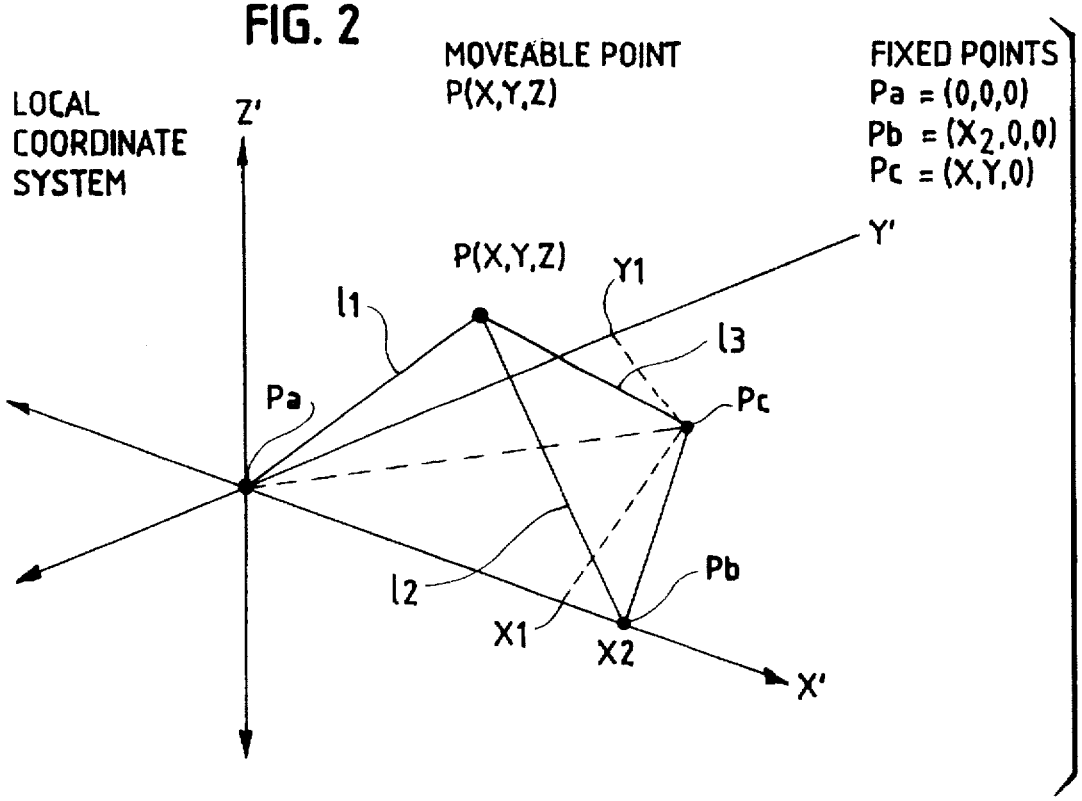
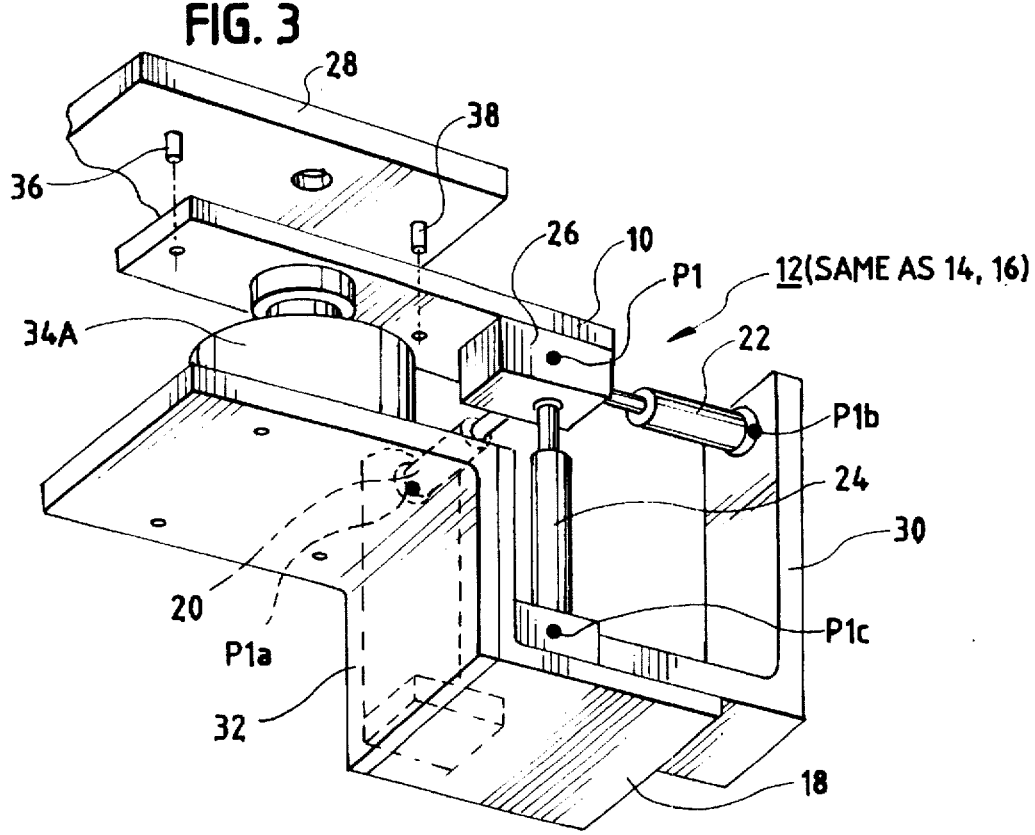

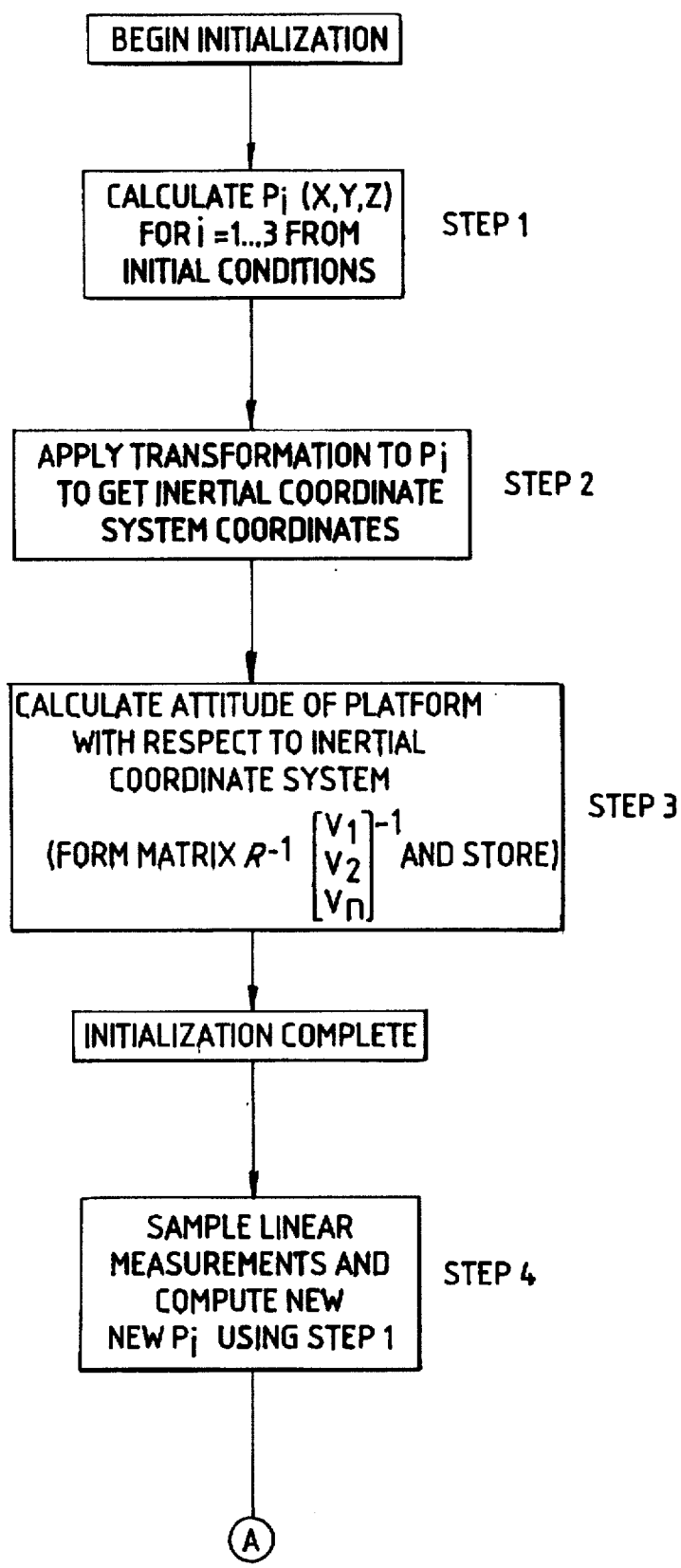

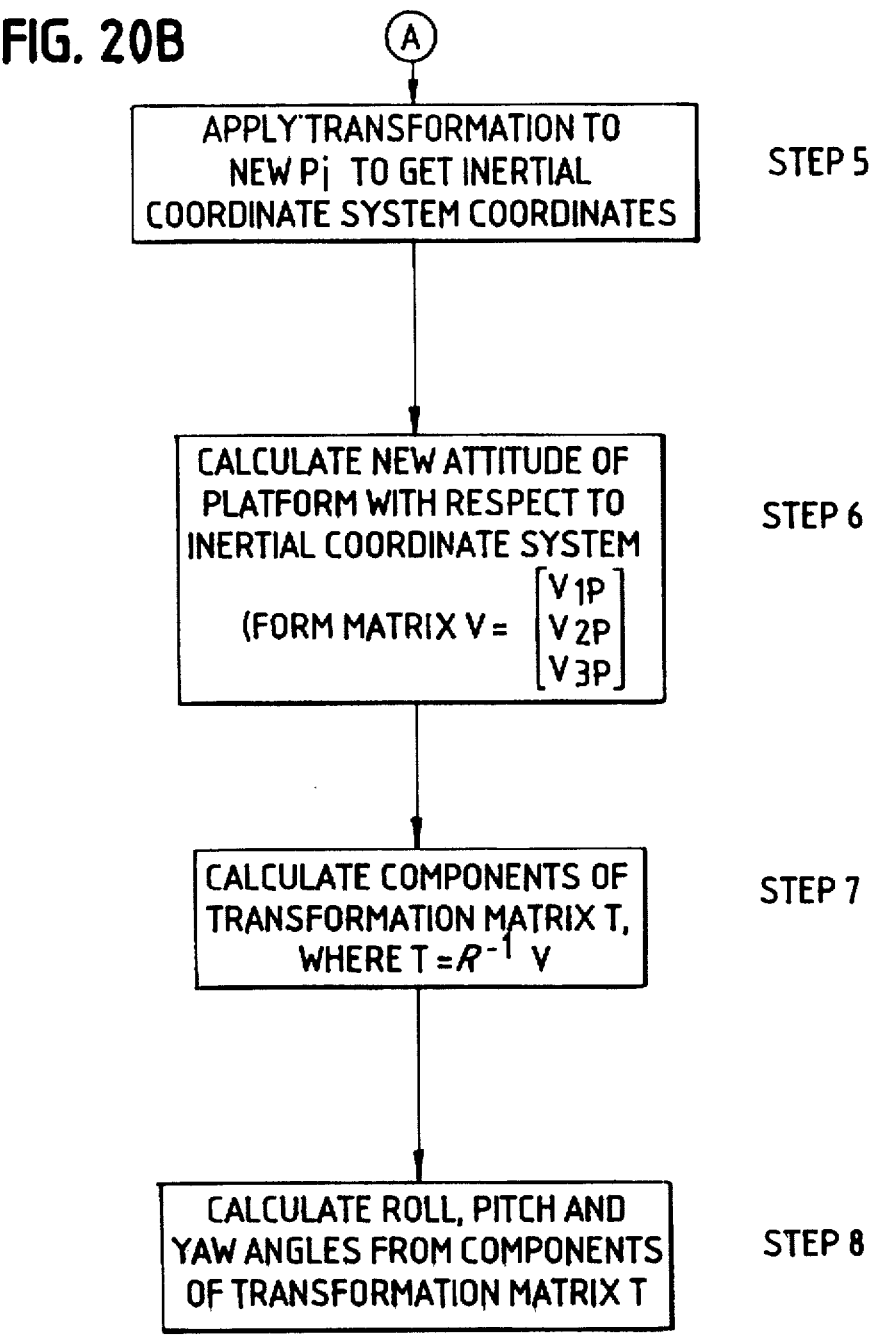

PLATFORM ATTITUDE MEASUREMENT SYSTEM

NOTICE RE: COPYRIGHTS

A portion of the disclosure of this patent document contains matter subject to copyright protection. The copyright owner has no objection to the facsimile reproduction by anyone of the patent disclosure, as it appears in the Patent and Trademark Office files and records, but otherwise retains all copyright rights whatsoever.

BACKGROUND OF THE INVENTION

A. Field of the Invention

This invention relates generally to the field of stabilization systems. In one particular aspect, the invention relates to systems that stabilize an optical system, such as a camera, that is mounted to a platform relative to a vehicle, such as an aircraft or land-based vehicle, which is subject to motion about one or more axes of rotation. However, the invention is applicable to other types of systems which utilize information as to the attitude of a "platform", i.e., a movable body, relative a fixed frame of reference.

B. Description of Related Art

It is conventional in the art of aerial reconnaissance to mount cameras to a platform that is stabilized with respect to an inertial frame of reference as the aircraft undergoes rotations about roll, pitch or yaw axes. To protect the camera itself and the camera support equipment mounted on the platform, it is also conventional to mount the platform to passive compliant isolation mounts, one example being compliant mounts known as Barry™ mounts. These devices are usually made of rubber and are designed to provide a compliant mount, i.e., the mount provides a limited range of motion of the platform. The compliance of the mount smooths shocks and attenuates vibration which can degrade or damage the camera and support equipment. The camera platform itself is usually mounted on four of these devices. Typically, each mount permits motion within a sphere, for example, a 0.75 inch diameter sphere. The combined effect of such movement is that the camera pointing angle may vary up to 2 degrees from the expected orientation.

The isolation of the camera from the aircraft provided by the compliant mounts, and the concomitant movement of the platform within the range of motion permitted by four of such mounts, hinders the ability of a camera mounted to the platform to be precisely pointed in a desired direction. In modem imaging systems, there is a need to be able to point the line of sight of a camera at a precise latitude and longitude in order to gather data about that location. Also, for a given image, a capability of deriving the latitude and longitude coordinates of each picture element (pixel) is sometimes needed. While a stabilization system will hold the line of sight steady to obtain an image, the stabilization systems do not know precisely where, in inertial space, the camera is pointing due to the platform movement permitted by the passive isolation mounts. This uncontrolled movement also makes it impossible to assign coordinates to the image.

On virtually all aircraft used today in aerial reconnaissance, an inertial navigation system (INS) is used to generate aircraft latitude and longitude information, and roll, pitch and yaw information. An INS provides most of the information needed for precise pointing of a stabilized camera. However, the problem exists that the camera platform is mounted to the airframe on compliant mounts such that the platform roll, pitch and yaw is slightly different than the airframe angles. One solution to providing precise pointing information to the camera would be to mount an INS directly on the platform. This solution is generally not feasible, due primarily to space and weight constraints and cost.

The present invention provides a effective solution to the problem of achieving precise pointing capability for a camera mounted to a passively isolated platform. The invention achieves this result by precisely measuring the roll, pitch and yaw platform angles caused by the compliance of the platform mounts. These measurements, which can be thought of as an "offset" from an original setting in which the platform is in roll, pitch and yaw alignment with the aircraft frame, are then summed with the INS-measured roll, pitch and yaw angles. The resultant roll, pitch and yaw angles accurately reflect the current orientation of the camera in an inertial reference frame, thereby enabling the scan head of the camera to precisely point the camera line of sight to a desired location, and enabling the derivation of latitude and longitude coordinates for portions of the image.

As noted earlier, the present invention is applicable to other situations in which information as to the precise attitude of a platform is needed. One example is a six degree of freedom machining center, where the work piece is fixed and the tool moves relative to the work piece. The techniques of the present invention permit precise measurement of the attitude of the work piece about three mutually orthogonal axes of rotation analogous to the roll, pitch and yaw axes of an aerial reconnaissance camera platform. In this example, the measurements of the tool attitude may be used as a feedback mechanism to control the shape of the work piece. Another example would be the measurement of the attitude of a passively isolated car body (the "platform") relative to the vehicle's frame. The attitude measurements of the car body may be used in a suspension control system to effect a leveling of the body, or in some other adjustment of the vehicle's suspension. A third example of the utilization of the invention would be as an angular position feedback sensor system incorporated in a line of sight stabilizing apparatus, for example the retrofit line of sight stabilization apparatus disclosed in the pending patent application of John Lecuyer and James P. Quinn, Ser. No. 08/224,761, filed Apr. 8, 1994, and assigned to the assignee of the present invention. From the following detailed description, other possible implementations of the invention will be apparent to those of ordinary skill in the art.

SUMMARY OF THE INVENTION

These and other objects and advantages of the invention are provided by a system for measuring the attitude of the platform movable relative to a fixed frame. In an overall aspect, the system comprises at least three mounting assemblies. In the preferred embodiment, each of the three mounting assemblies comprises (a) a compliant isolation mount interconnecting the platform to the frame. The compliant isolation mount permits the platform to move relative to the frame. The mounting assemblies also comprise (b) a means for measuring the movement of a point on the platform relative to the frame about three orthogonal axes. The means for measuring, in the preferred embodiment, comprise a set of three linear position sensors, each having a known fixed attachment point to the frame and an end portion that terminates at or about the point on the platform. The three linear position sensors need not be oriented in a mutually orthogonal position relative to each other. The linear position sensors generate measurement signals from which the measurements of platform movement about the three orthogonal axes are derived. The system further comprises a data processor that receives the measurement signals and responsively calculates the attitude of the platform relative to the frame according to a procedure described in detail herein.

In an embodiment of the invention wherein the platform includes an aerial reconnaissance camera system, the platform is mounted to a portion of the aircraft frame. The data processor obtains from the aircraft's inertial navigation system current information as to roll, pitch and yaw of the aircraft, and sums the calculated roll, pitch and yaw platform angles with aircraft roll, pitch and yaw information derived from the inertial navigation system. Thus, the data processor derives the attitude of the platform in an inertial frame of reference and corrects for platform movement caused by the passive isolation mounts, permitting precise pointing of the aerial reconnaissance camera.

BRIEF DESCRIPTION OF THE DRAWINGS

In the following detailed description, presently preferred and alternative forms of the invention are described in conjunction with the appended drawings, wherein like reference numerals refer to like elements in the various views, and wherein:

FIG. 2 is an illustration of the local coordinate system and geometrical relationship between three fixed points Pa, Pb and Pc relative to a movable point P, the three fixed points corresponding to points Pna, Pnb and Pnc and the movable point P corresponding to the points Pn of FIG. 1, where n=1, 2 or 3;

FIG. 3 is a perspective view of a portion of a platform that is stabilized with respect to a frame, showing one of the three sets of three linear position sensors that are used to measure the movement of the platform relative to the frame;

FIGS. 20A and 20B are a diagram of the sequence of steps used by a data processor and an associated memory in calculating the attitude of the platform relative to the frame given the linear position sensor arrangements of FIG. 1;

DETAILED DESCRIPTION OF THE PREFERRED AND ALTERNATIVE EMBODIMENTS OF THE INVENTION

I. General Discussion

Figure 1A:
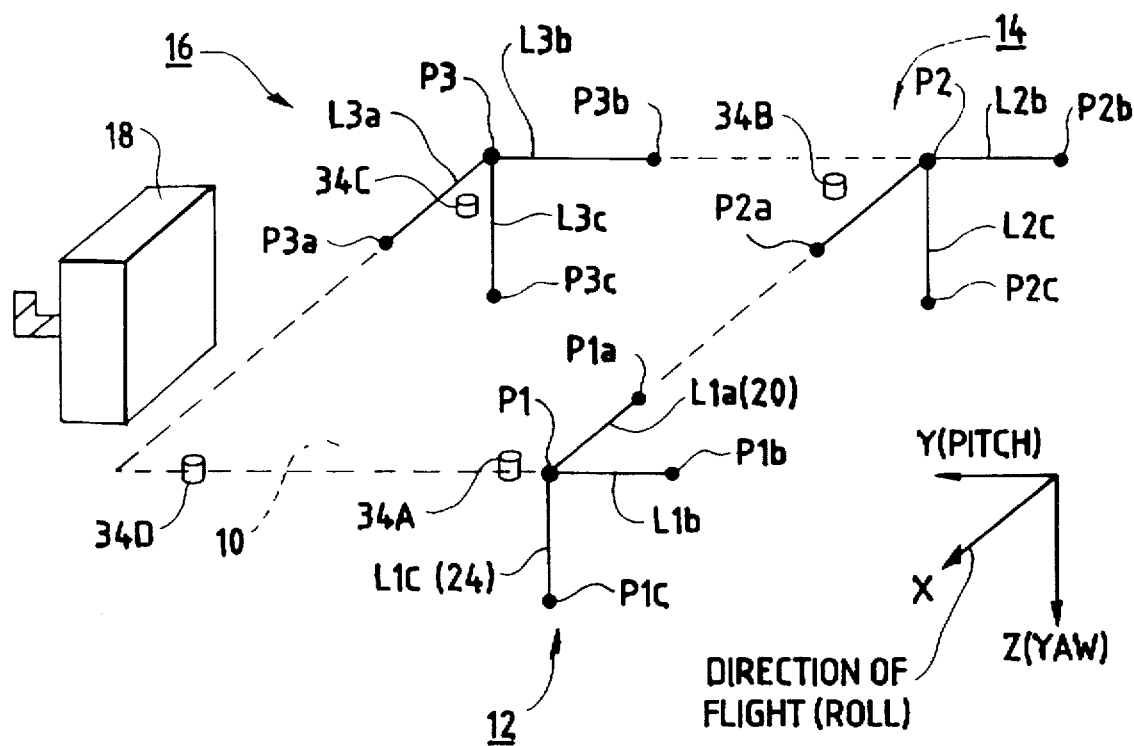
FIG. 1A is a schematic illustration of three sets of three linear position sensors with placed at three locations about a platform, each of the sets of linear position sensors used for measuring the movement of points on the platform about three mutually orthogonal axes.

Referring now to the simplified schematic diagram of FIG. 1A, the invention provides for the measurement of the attitude of a platform 10 relative to a fixed frame 18. The instrumentation needed to measure the roll, pitch and yaw attitude of a platform 10 is comprised of nine linear position sensors (L1a, L1b, L1c, L2a, L2b, L2c, L3a, L3b, L3c) that are organized into three sets 12, 14 and 16, with three linear position sensors per set. The three sensors in each set form a tetrahedron which have a local coordinate system as shown in FIG. 2.

FIG. 1 shows the three tetrahedra in the global coordinate system of the frame (or aircraft or other vehicle in which the platform 10 is mounted). The points P1, P2 and P3 are points on the platform 10 and thus are moveable relative to the 9 known fixed points (P1a, P1b, P1c, P2a, P2b, P2c, P3a, P3b, P3c), which are attached to the frame 18 or otherwise fixed with respect to the platform 10. The linear position sensors (e.g., L1b) measure the distance from their respective fixed point (e.g., point P1b) to their respective movable point (e.g., point P1). The platform 10 is isolated from the fixed frame 18 by four compliant isolation mounts, such as the passive Barry™ mounts 34A, 34B, 34C, and 34D. The compliant isolation mounts 34A-D permit the platform 10 to translate and rotate about three mutually orthogonal axes X, Y and Z.

It will be understood by those of ordinary skill in the art that active mounts may also be used to isolate the platform from the frame, and that the invention is not limited to the use of passive mounts. Indeed, the invention may be practiced in situations in which the platform is not even mounted to the frame, but rather is free to move relative to the frame.

It will be further understood that the term "platform" is intended to mean a moveable body or structure for which attitude information is desired. Further, the term "frame" as used herein means a body that is fixed relative to the moveable platform, and should not be interpreted to mean a frame-like structure exclusively. As will be noted in the following description, the frame 18 may take a variety of physical forms depending on the environment in which the invention is practiced. For example, in an aerial reconnaissance application, the frame may be part of a rigid superstructure that is attached to an aircraft airframe.

The term "global coordinate system" refers to the coordinate system of the "fixed" part of the system, e.g., the fixed frame 18, or the coordinate system of the aircraft frame. The term "inertial coordinate system" refers to the coordinate system of the fixed frame in an inertial frame of reference. For example, if the invention is practiced in an aircraft, the invention gives the attitude of the platform relative to the airframe, and the INS gives the attitude of the airframe relative to the earth as the aircraft undergoes rotations. By summing the platform attitude with respect to the airframe with the INS attitude information, the orientation of the platform in an inertial frame of reference (and in an inertial coordinate system) is achieved. In a terrestrial application of the invention in which the fixed frame remains stationary with respect to an inertial frame of reference and the platform moves relative to the fixed frame, the global and inertial coordinate systems are same.

Referring again to FIG. 1A, the measurement of platform 10 roll, pitch and yaw are made by the 9 linear position sensors $L_{n\,a,b,c}$ (n=1, 2, 3). Each set of 3 linear position sensors measures the position (and hence movement) of the movable points on the platform along three axes, which need not be orthogonal with one another. Taking set 12 for example, linear position sensors L1$a$, L1$b$ and L1$c$ are arranged in any convenient orientation. The calculations set forth below resolve the measurements of movement along the linear position sensor axes to measurements of movement along three orthogonal axes. Moveable points P1, P2 and P3 can be any three convenient attachment points on the platform 10, for example in the vicinity of the passive isolation mounts.

Figure 1B:
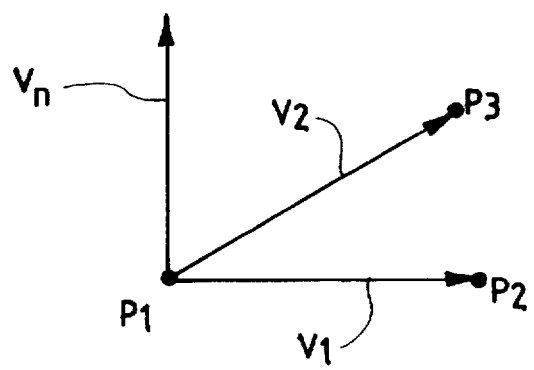
FIG. 1B is an illustration of vectors V1, V2 and Vn, where Vn=V1×V2.

From FIGS. 1A and 1B, it can be seen that points (P1 P2 P3) define a platform plane and that the vectors V1, V2 and Vn define the attitude of the platform 10 relative to a fixed frame in roll, pitch and yaw, where V1=P1–P2, V2=P1–P3 and Vn=V1 X V2, where X is the vector cross product operator.

Referring now to FIG. 3, one of the three sets of linear position sensors (i.e., set 12) is shown in conjunction with a platform 10 that is passively isolated from a frame 18, such as the aircraft frame in an aerial reconnaissance application. The set of three linear position sensors 12 includes linear position sensors 20, 22 and 24 corresponding to linear position sensors L1$a$, L1$b$ and L1$c$ of FIG. 1, respectively. The linear position sensors 20, 22 and 24 measure the movement of point P1 on the platform 10 relative to their fixed ends P1$a$, P1$b$ and P1$c$ along their respective axes. The linear position sensors have a movable ball end that terminates in a block 26. The block 26 has channels accommodating the ball ends of the linear position sensors, such that they meet about point P1.

Suitable rigid mounting brackets 30 and 32 may be provided, if needed, for the linear position sensors 20 and 22. The platform 10 is passively isolated from the frame 18 by passive compliant isolation mounts, such as Barry™ mount 34A, only one of which is shown in FIG. 3. The camera superstructure 28 is attached to the platform 10 with suitable mounting bolts or other hardware 36, 38.

Referring to FIGS. 1 and 3, it will be appreciated that the entire mounting arrangement for the platform 10 consists of four compliant isolation mounts (preferably mounted at roughly the four corners of the platform), along with the three sets of three linear position sensors 12, 14 and 16, of which one of the sets is shown in FIG. 3. The other two sets of linear position sensors, and their arrangement relative to the platform, are essentially the same as shown in FIG. 3.

Figure 4:
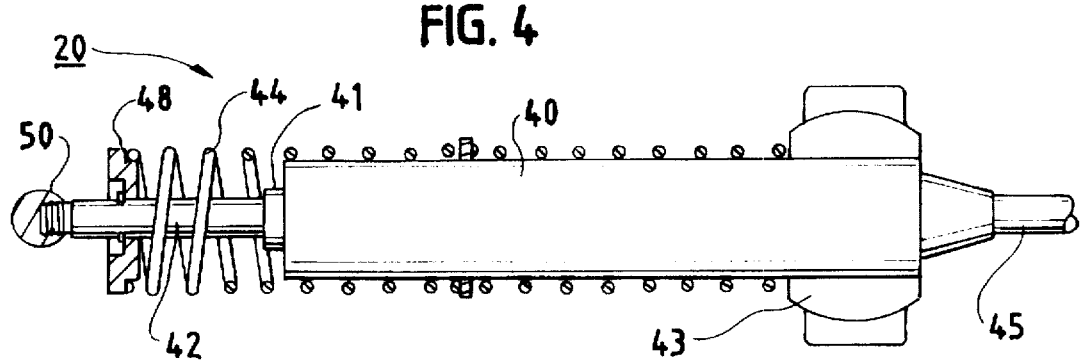
FIG. 4 is a plan view of a linear position sensor of FIG. 3.
Figure 5:
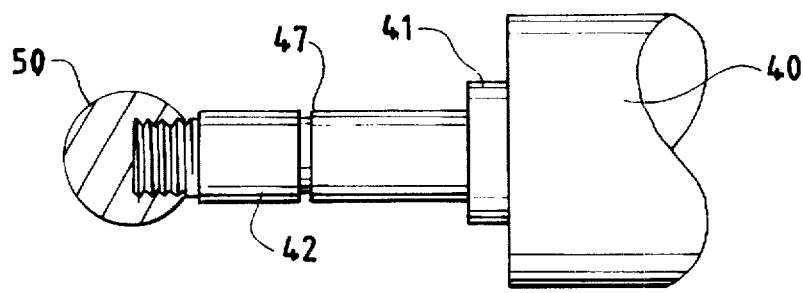
FIG. 5 is a detailed view, partially in section, of the ball end portion of the linear position sensor of FIG. 4.

Referring now to FIG. 3 and 4, a linear position sensor 20 of FIG. 3 is shown isolated in a plan view, with the ball end 50 shown partially in section. The position sensor 20 comprises a potentiometer having a collar member 40 and a moveable piston or shaft 42 that moves through bushing 41 relative to the collar 40. A biasing spring 44 having one end against the bearing 43 and another end against a flange 48 biases the ball end 50 into the channel in the block 26 that receive the ball end of the sensor 20. The fixed ends of the linear position sensors 20, 22 and 24 have a spherical bearing 43 that allows the linear position sensor to rotate to keep the collar 40 and shaft 42 in proper alignment. A cable 45 is provided to carry measurement signals from the linear position sensor 20 to a data processor. FIG. 5 is a detailed view of the ball end 50 and piston 42 with the spring 44 removed. The ball end 50 threads onto the extreme end of the piston 42. A retaining ring (not shown) and groove 47 retains the flange 48. A suitable linear position transducer (e.g., sensor 20) for use in the present invention is part no. F38000201 available from Data Instruments, 100 Discovery Way, Acton Mass. 01720. This model corresponds to a one inch travel, 0.1% accurate device. The end portion of the collar 40 may have to be machined slightly as needed to fit the end of the collar 40 into the spherical bearing 43.

Figure 6:
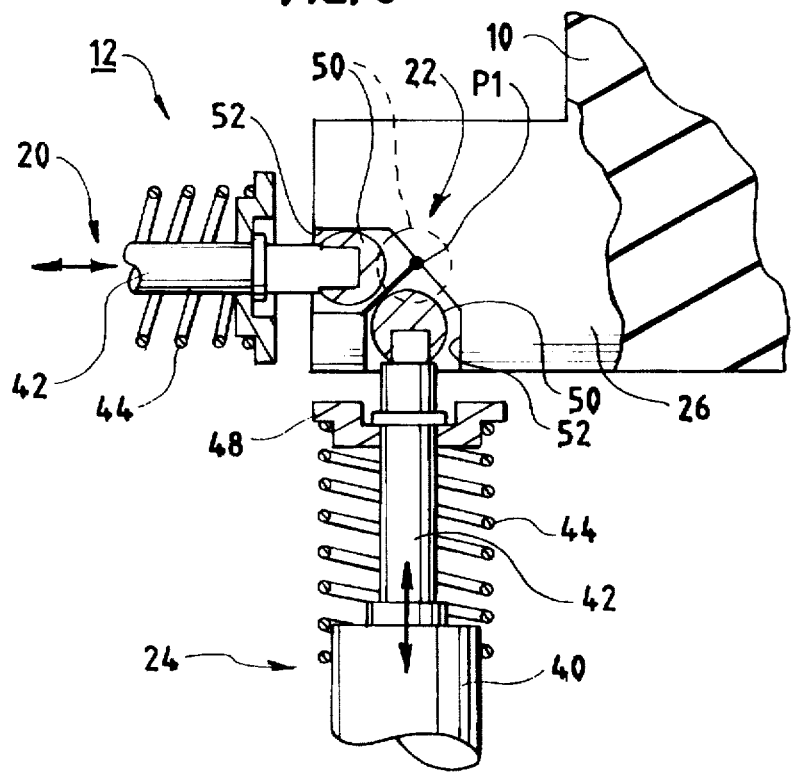
FIG. 6 is a detailed illustration of the intersection of the three linear position sensors of FIG. 3 at a point on the platform.
Figure 10:
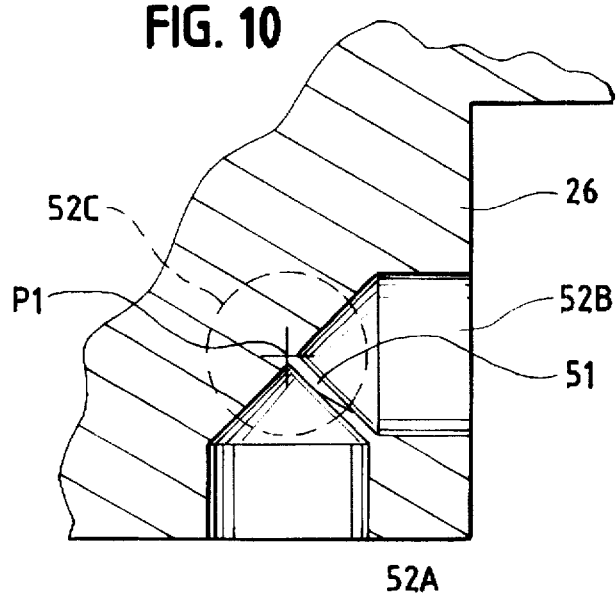
FIG. 10 is an isolated cross-sectional view of the block 26 of FIGS. 3 and 7-9, partially broken away, showing the three channels that accommodate the ball ends of the linear position sensors.
Figure 11:
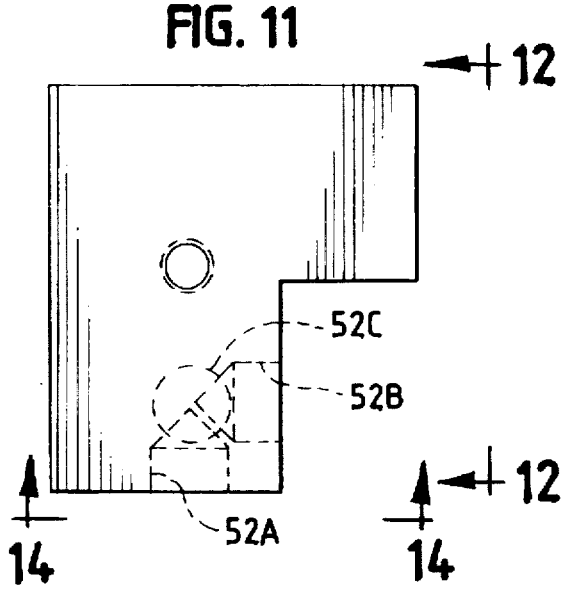
FIG. 11 is a top plan view of the block 26 of FIG. 9.
Figure 12:
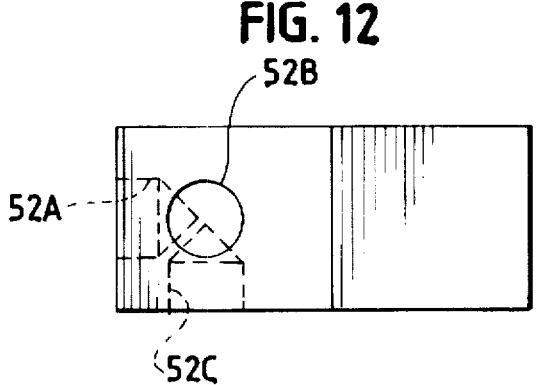
FIG. 12 is a side elevational view of the block 26.
Figure 13:
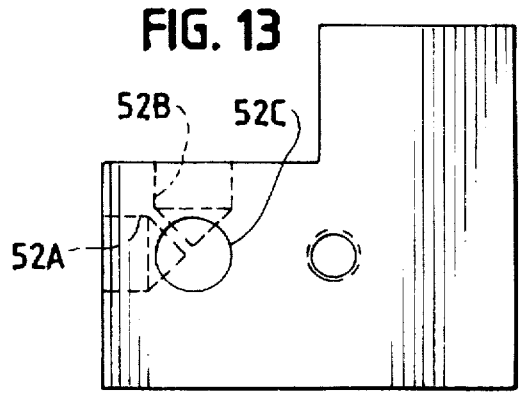
FIG. 13 is a bottom plan view of the block 26.
Figure 14:
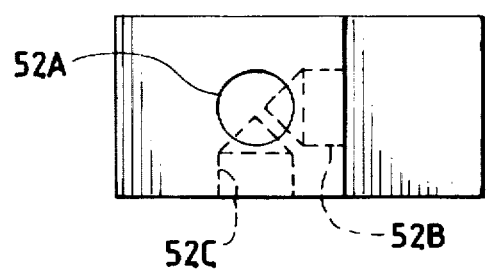
FIG. 14 is another elevational view of the block 26.

The intersection of the linear position sensors of FIG. 3 and the block 26 is shown in detail in FIG. 6. The block 26 is shown in isolated FIGS. 10–14. FIG. 10 is an isolated cross-sectional view of the block 26, partially broken away, showing the three channels 52A–C that accommodate the ball ends 50 of the linear position sensors. Web 51 of block 26 separates channels 52A from channel 52B, and webs are also are provided to separate channel 52A from channel 52C and channel 52B from channel 52C. FIG. 11 is a top plan view of the block 26. FIG. 12 is a side elevational view of the block 26. FIG. 13 is a bottom plan view of the block 26 and FIG. 14 is another elevational view of the block 26. The channels 52 on the block 26 are positioned such that the three ball ends 50 of sensors 20, 22 and 24 meet about the point P1. The springs 44 also serve to relieve off-axis side loading effects on the linear position sensors 20, 22 and 24. As the platform 10 moves, P1 (and block 26) moves about a sphere due to the compliance of the passive isolation mounts 34 (FIG. 3). This motion is measured by the three potentiometers 20, 22 and 24 (and of course, measured in a similar fashion by the other two sets of three linear position sensors). The linear position sensors 20, 22, 24 etc. provide measurement signals to a digital data processor (not shown) that implements via software a program to calculate the attitude of the platform 10 relative to the frame 18.

Figure 7:
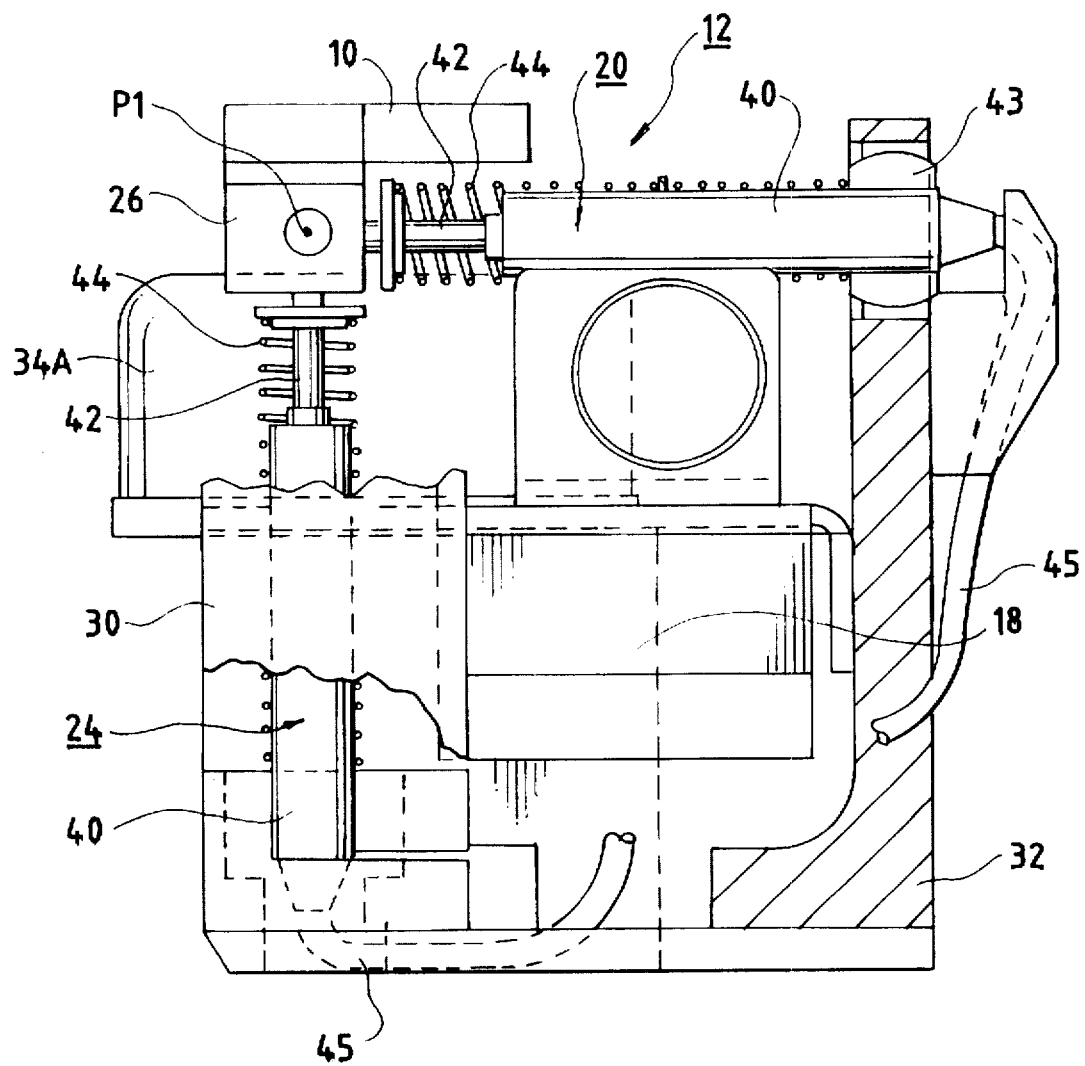
FIG. 7 is an elevational view of the mounting assembly of FIG. 3.

The mounting arrangement of FIG. 3 is shown in a side elevational view in FIG. 7, taken generally in the plane of linear position sensors 20 and 24, looking in the direction of Barry™ mount 34A. Linear position sensors 20 and 24 are shown, with the third linear position sensor 22 being positioned in front of block 26 and oriented in a direction going into the page. The ball ends of the three linear position sensors meet in the block 26 about point P1. The support member 30 is shown partially broken away to show the detail of the upper portion of the linear position sensor 24, including the piston 42 and spring 44. The support member 32 is shown in cross-section, to show the placement of the spherical bearing 43 in the support member 32. Cables 45 carry the measurement signals to the data processing equipment.

Figure 8:
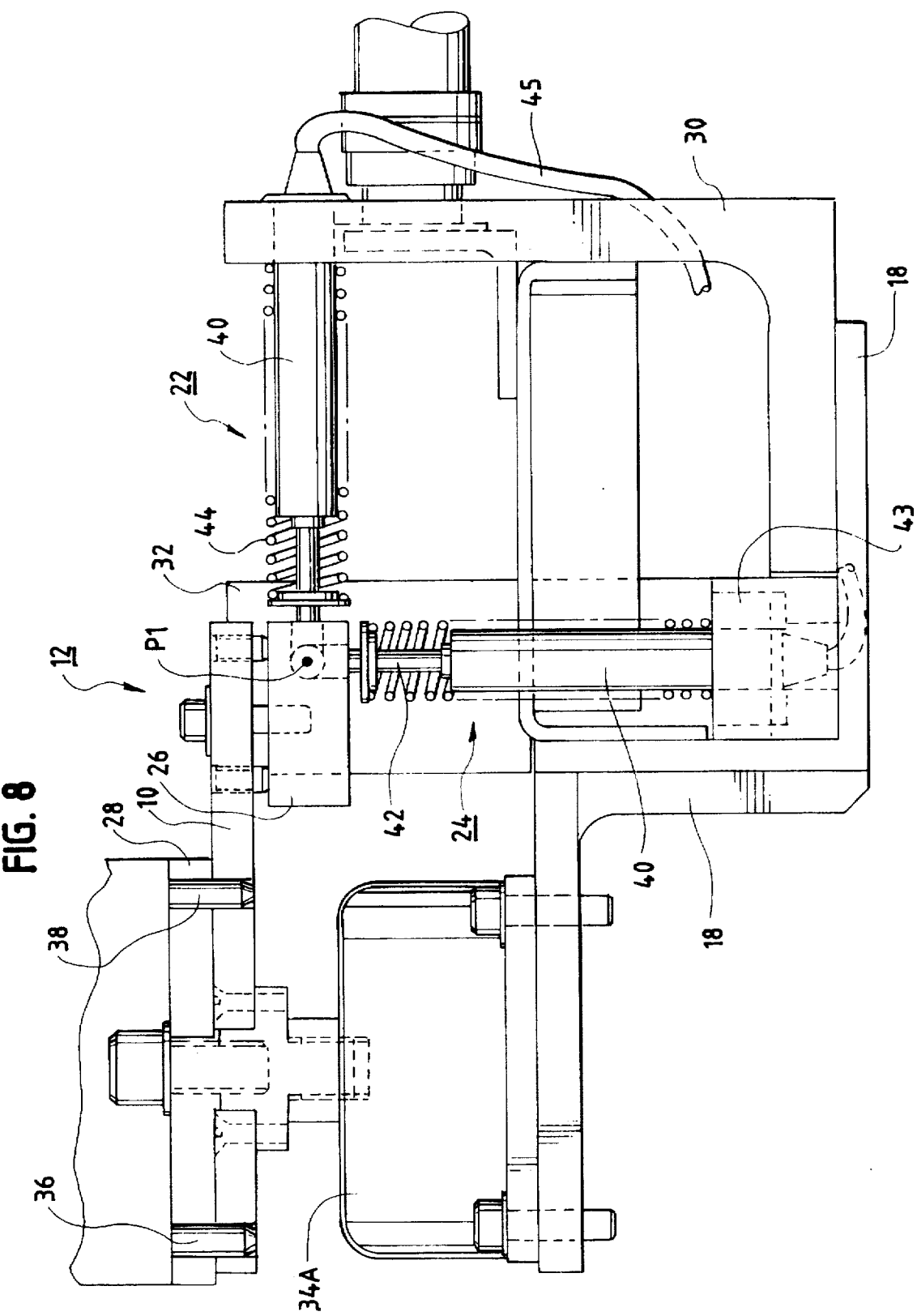
FIG. 8 is another elevational view of the mounting assembly of FIG. 7.

FIG. 8 is another side elevational view of the mounting arrangement of FIGS. 3 and 7, taken generally in the plane of linear position sensors 22 and 24. Linear position sensor 20 is positioned behind block 26, oriented in a direction coming out of the page.

Figure 9:
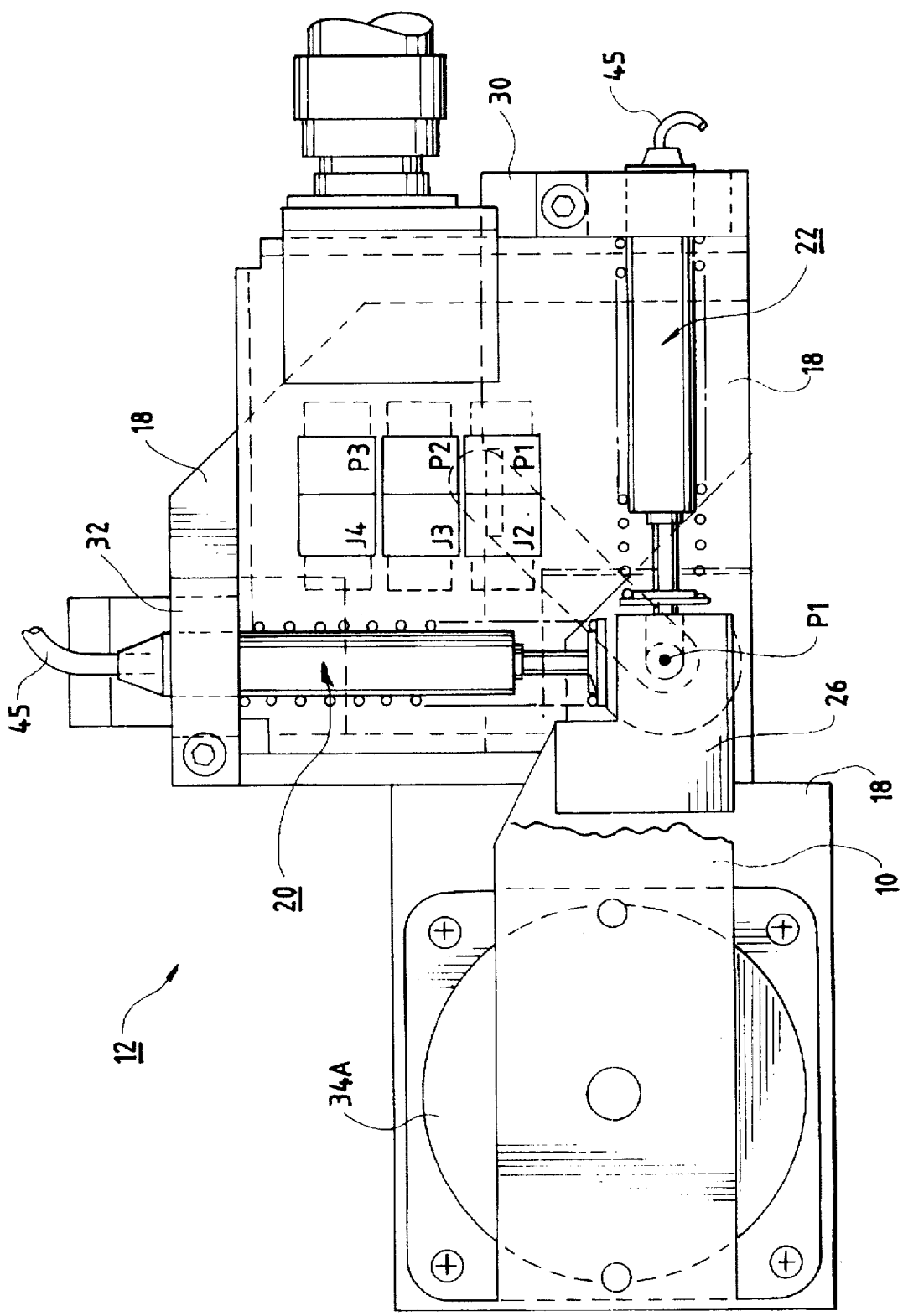
FIG. 9 is a top plan view of the mounting assembly of FIGS. 7 and 8.

FIG. 9 is a plan view of the mounting arrangement of FIGS. 3, 7 and 8, as seen from above. Linear position sensor 24 is placed below block 26 and oriented upwards such that the ball end of the sensor 24 meets at point P1 in block 26.

A presently preferred implementation of the invention is shown in several views in FIGS. 15–19. An aerial reconnaissance camera system 100 is mounted to a platform 10, which is passively isolated from a fixed frame 18. The three sets of linear position sensors 12, 14 and 16 of FIG. 1 are shown, as are the three individual linear position sensors of each set. The nine known fixed points P1a, P1b, P1c, etc., corresponding to the points P1a, P1b, P1c, etc. of FIG. 1, are also shown.

Figure 15:
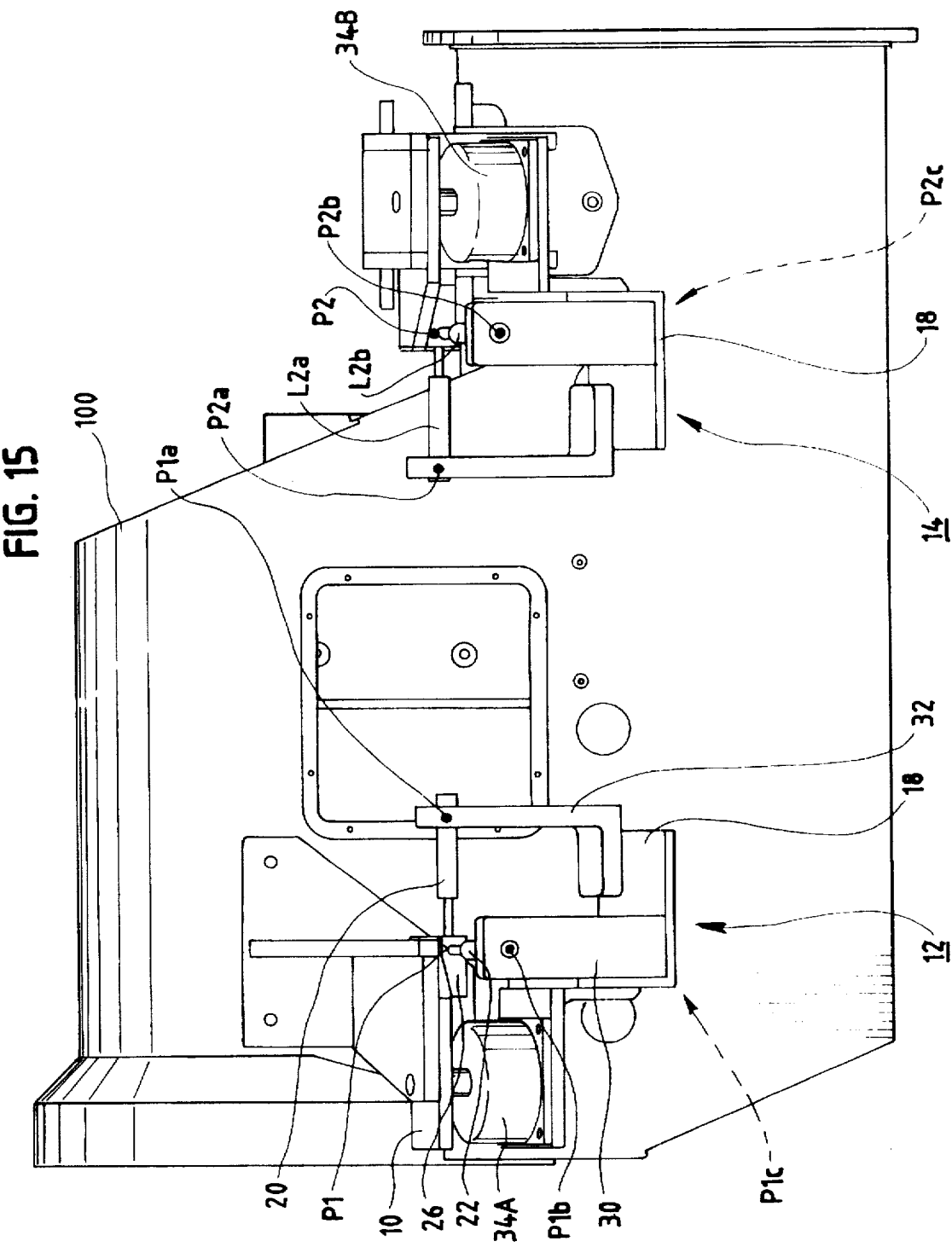
FIG. 15 is a side elevational view of a camera platform and frame embodying a preferred form of the platform attitude measurement system invention.

FIG. 15 is a side elevational view of a camera system 100 and platform 10, passively isolated from the frame 18 by passive isolation mounts 34A and 34B. Two sets of linear position sensors 12 and 14 are shown on this side of the camera system 100, and measure the movement of the points P1 and P2, respectively, of the platform 10.

Figure 16:
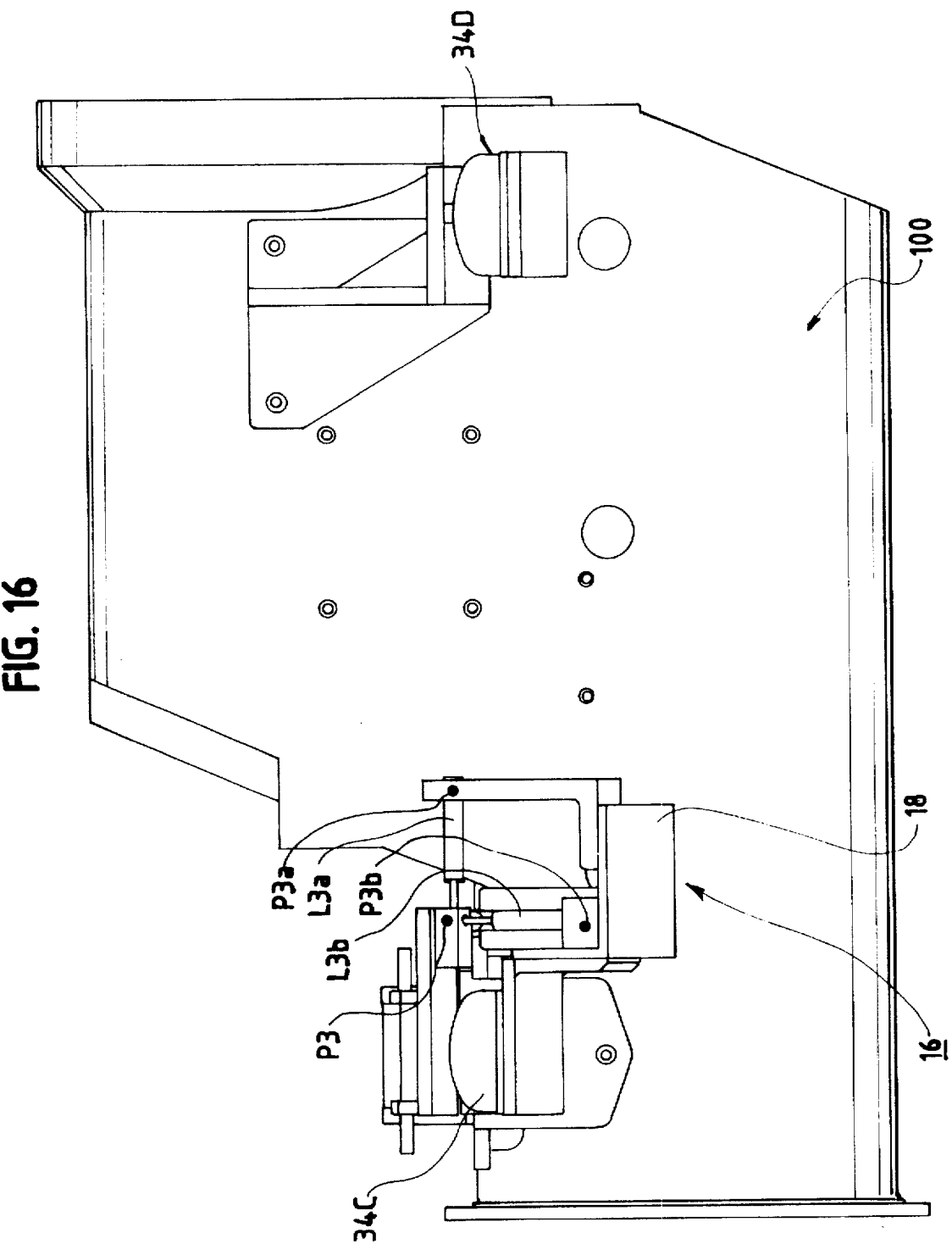
FIG. 16 is an elevational view of the camera platform and frame of FIG. 15 opposite to that shown in FIG. 15.

FIG. 16 is an elevational view of the camera system 100 of FIG. 15 as seen from the opposite side to that shown in FIG. 15. Two additional passive isolation mounts 34C and 34D, for a total of four, are used to isolate the platform 10 and camera system 100 from the frame 18. A third set of linear position sensors 16 is shown on this side of the camera system to measure the movement of the point P3 of platform 10.

Figure 17:
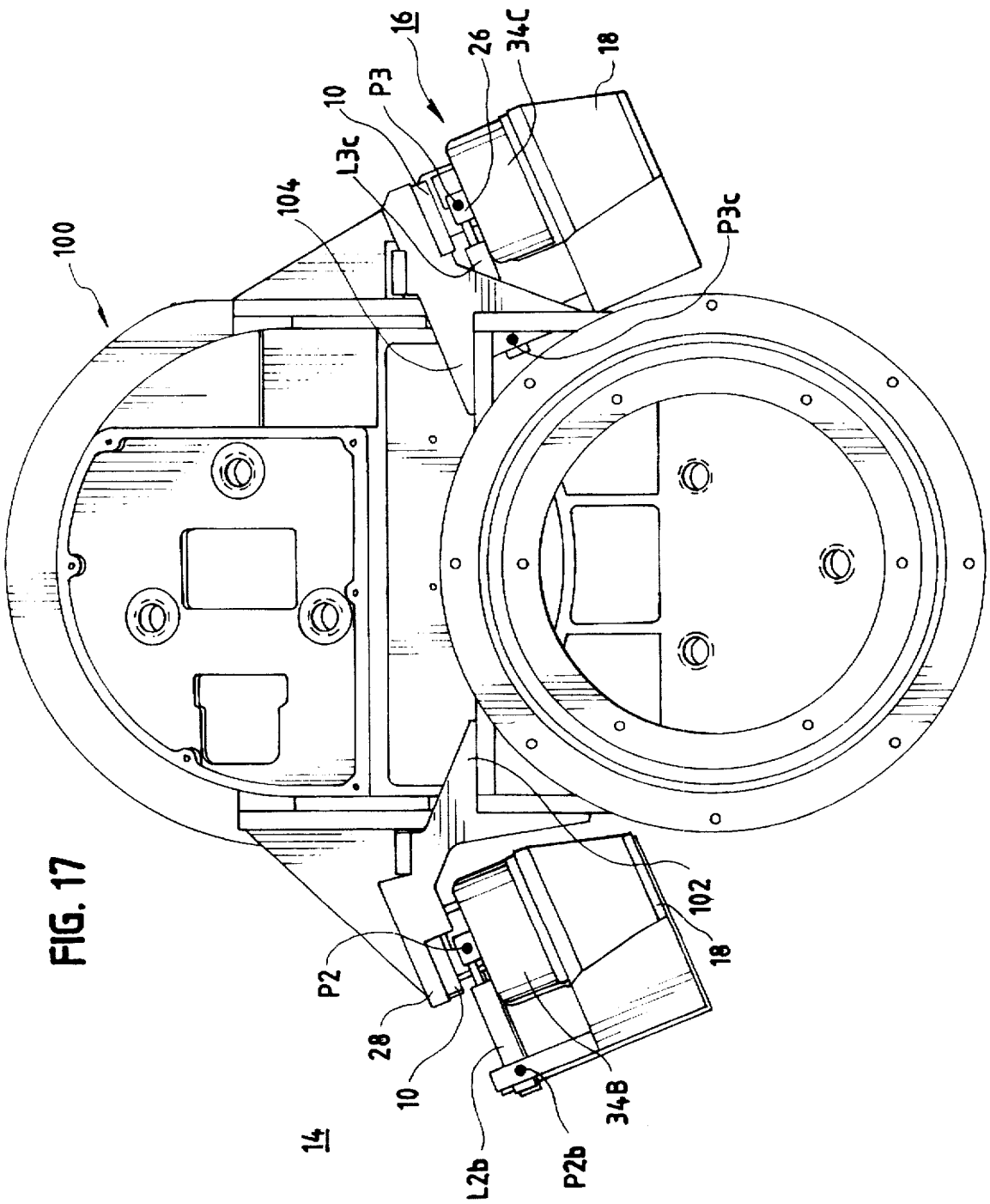
FIG. 17 is a front elevational view of the platform and frame of FIG. 15.

FIG. 17 is a front elevational view of the camera system 100 and mounting arrangement of FIGS. 15 and 16, showing the linear position sensor sets 14 and 16 and the passive isolation mounts 34B and 34C. Support beams 102 and 104 are attached to the platform 10 and assist in carrying the entire camera system 100.

Figure 18:
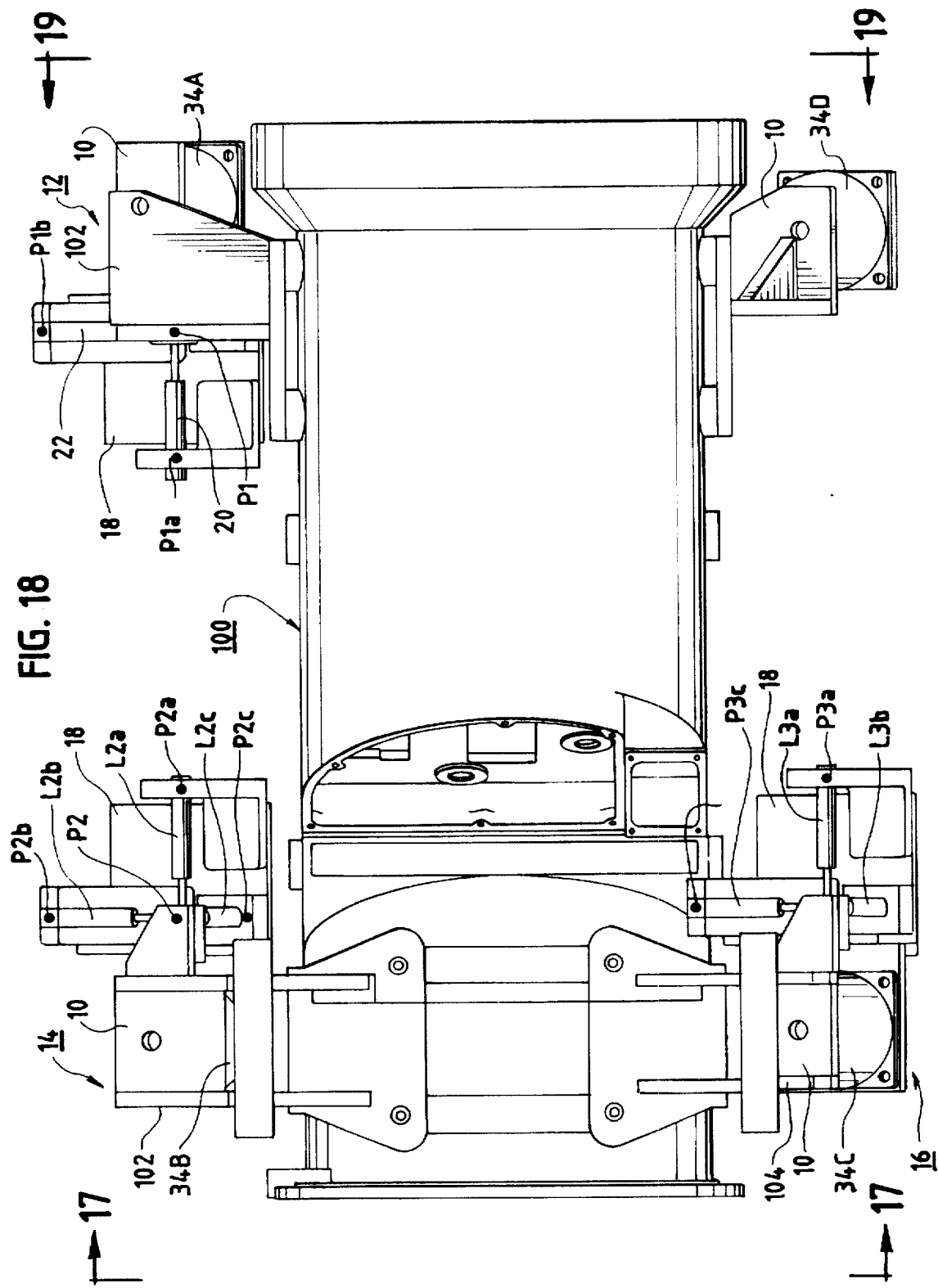
FIG. 18 is a top plan view of the platform and frame of FIG. 15.

FIG. 18 is a top plan view of the camera system and mounting assemblies of FIGS. 15–17, showing the three sets of three linear position sensors, i.e., sets 12, 14 and 16.

Figure 19:
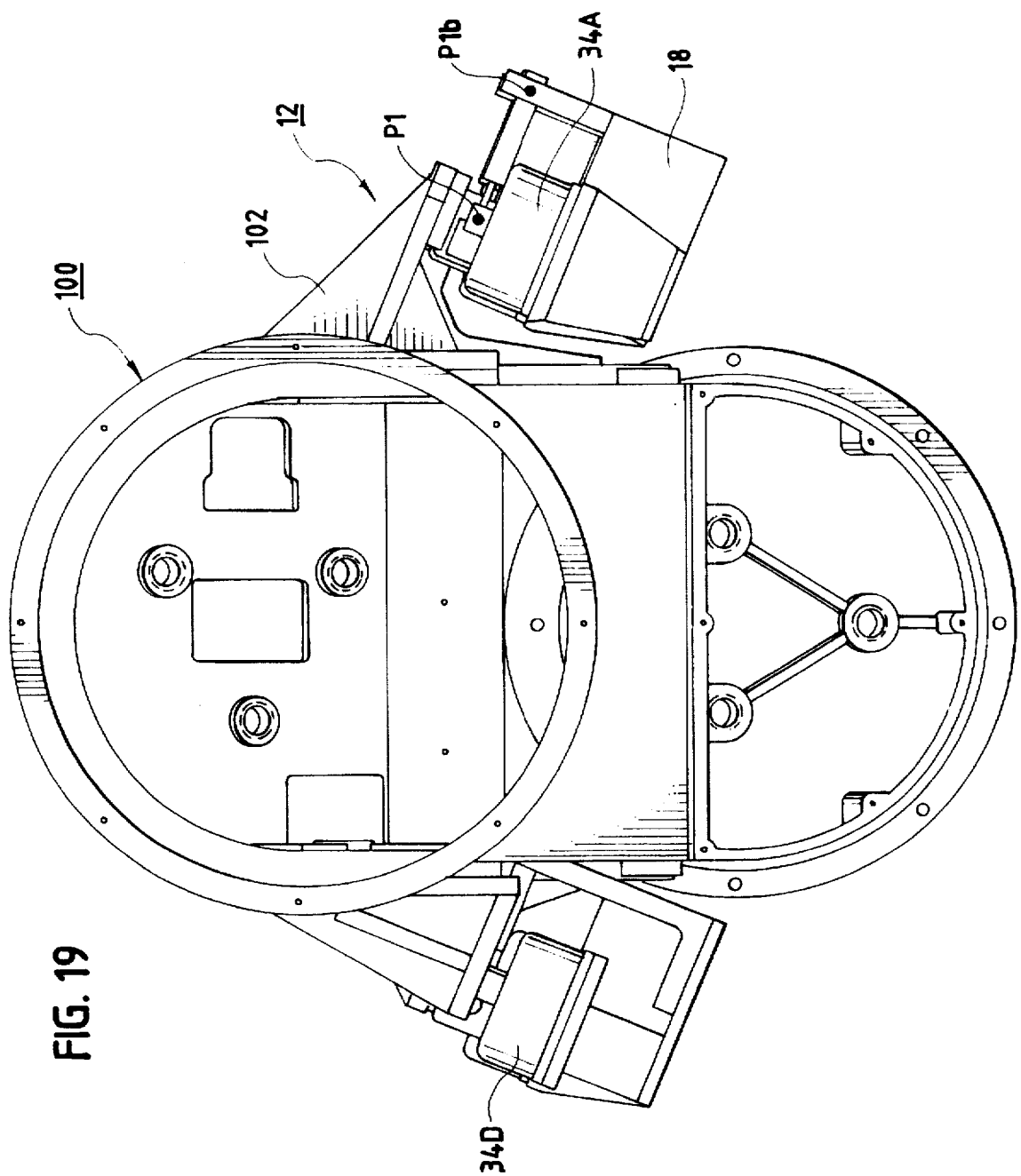
FIG. 19 is a rear elevational view of the platform and frame of FIG. 15.

FIG. 19 in an elevation view of the camera system 100 and mounting arrangement of FIG. 18, seen from the opposite end of FIG. 17, showing the passive isolation mount 34D and linear position sensor set 12.

II. System Implementation and Calculation of Platform Attitude

The implementation of the invention involves a computation of a reference matrix based on initial platform position information during an initialization phase (e.g., prior to the aerial reconnaissance mission), and then the computation of the platform attitude in real time when the need for such information arises. In the initialization phase, using known linear position measurements in an initial condition and the position of the known fixed points, the local coordinates of the movable points P1, P2 and P3 are calculated using the Law of Cosines. Once the local coordinates of the three movable points are known, they can be transformed into a global coordinate system as discussed below. The three moveable points P1, P2 and P3 define a plane. Following the procedure set forth below, a 3×3 reference matrix R is formed which contains 2 vectors V1 and V2 in the plane intersecting at a point and a vector Vn normal to the plane. See FIG. 2. The inverse of this matrix, $R^{-1}$, is then computed and stored. This initialization procedure should first be performed when the camera on the platform is being aligned, with the passive isolation mounts in a locked condition.

Once the platform is unlocked, the measurement and computation procedures discussed below are used to calculate the airframe relative roll, pitch and yaw attitude of the platform in real time.

FIGS. 20A and 20B show the implementation procedure for both the initialization and real-time phases. The initialization phase begins at Step 1 with the calculation of the position of the three movable points P1, P2 and P3 in the initial or locked condition. Referring to FIG. 2, the coordinates of the fixed ends of the linear position sensors Pa, Pb, Pc are known, i.e., points Pa, Pb and Pc lie in an X',Y',Z' plane with Pa at the origin and distances x1, x2, y1 are known. Further, the initial measurement signals of the three linear position sensors L1, L2 and L3 for each set are known (e.g., the initial measurements made by linear position sensors 20, 22 and 24). The three coordinates of the position of point Pi (i=1, 2, 3)=Px, Py, Pz is computed by the Law of Cosines. The following relations are thus derived:

$$Px = x2/2 + [(L1^2 - L2^2)/2(x2)]$$

$$Py = [(L1^2 - L3^2 + x1^2 + y1^2 - 2(x1)(Px))]/2(y1) \qquad (1)$$

$$Pz = [L1^2 - Px^2 - Py^2]^{1/2}$$

At Step 2, once the three coordinates Px, Py and Pz are known for the three moveable points P1, P2 and P3, a transformation of the coordinates into the global coordinate system is performed. Given a point (x,y,z), a 1 X 3 vector, the transformed point (x',y',z') is given by the expression:

$(x',y',z') = [x,y,z] * \text{Troll} * \text{Tpitch} * \text{Tyaw} + \text{Txyz}$, where $$\text{Troll} = \begin{bmatrix} 1 & 0 & 0 \\ 0 & \cos(\text{roll}) & \sin(\text{roll}) \\ 0 & -\sin(\text{roll}) & \cos(\text{roll}) \end{bmatrix}$$

$$\text{Tpitch} = \begin{bmatrix} \cos(\text{pitch}) & 0 & -\sin(\text{pitch}) \\ 0 & 1 & 0 \\ \sin(\text{pitch}) & 0 & \cos(\text{pitch}) \end{bmatrix}$$

$$\text{Tyaw} = \begin{bmatrix} \cos(\text{yaw}) & \sin(\text{yaw}) & 0 \\ -\sin(\text{yaw}) & \cos(\text{yaw}) & 0 \\ 0 & 0 & 1 \end{bmatrix}$$

Txyz=translation matrix [dx dy dz].

At Step 3, the coordinates of the three moveable points are known in the global coordinate system. The three points P1, P2 and P3 are coplanar. The attitude of this plane with respect to the global coordinate system needs to be calculated. The translation effects are typically not needed and are removed. The 3X3 reference matrix $$R = \begin{matrix} V1 \\ V2 \\ Vn \end{matrix}$$

is calculated as follows. The vectors V1, V2 and Vn are computed, where $$V1 = P1 - P2 = (V11, V12, V13)$$

$$V2 = P1 - P3 = (V21, V22, V23) \qquad (3)$$

$$Vn = V1 \times V2 = (Vn1, Vn2, Vn3)$$

where $$Vn = \begin{vmatrix} i & j & k \\ V_{11} & V_{12} & V_{13} \\ V_{21} & V_{22} & V_{23} \end{vmatrix}$$

and

Vn1=V11V23–V13V22

Vn2=V13V21−V11V23
Vn3=V11V22−V21V12

The inverse of the reference matrix R is $R^{-1}$, which is then calculated and stored in a memory for the digital data processor. The inverse of the reference matrix, $R^{-1}$, is used to derive the platform attitude in real time. The initialization phase is now complete, and the platform mounts are unlocked from the global coordinate system.

When the need arises to determine the new attitude values for the platform, the measurement signals of the 9 linear position sensors are sampled. Using the procedure of Step 1 above, with new values for L1, L2 and L3, the new local coordinates Px, Py and Pz are calculated.

At Step 5, the transformation procedure of Step 2 is used to get the position coordinates of the points P1, P2, P3 in the global coordinate system. These new coordinates are referred to herein as P1P, P2P and P3P.

At Step 6, the procedure of Step 3 is used to calculate the new attitude of the platform with respect to the global coordinate system. This is done by forming the 3X3 matrix V, where $$V = \begin{bmatrix} V1p \\ V2p \\ Vnp \end{bmatrix}$$

Using the vectors removes the translation effects from the three points, since the platform is a six degree of freedom system (three translation, three rotation).

At Step 7, a calculation of three components of a transformation matrix T, where $T = R^{-1} V$ is then performed. It will be appreciated that vectors V1p, V2p and Vnp are the original reference vectors V1, V2, Vn (reference matrix R) taken through a roll, pitch, yaw coordinate transformation. By knowing the V and R matrices, the transformation matrix T can be calculated. Since V=RT, it follows that $T=R^{-1}V$. The inverse matrix $R^{-1}$ was computed in the initialization phase, and V was calculated as described above.

The transformation matrix T is of the form of a 3X3 matrix, the product of Troll * T pitch * Tyaw which were given above in the description of Step 2. The resulting matrix T is as follows:

$$T = \text{Troll} * \text{Tpitch} * \text{Tyaw} \quad (4)$$

$$= \begin{bmatrix} 1 & 0 & 0 \\ 0 & cr & sr \\ 0 & -sr & cr \end{bmatrix} \begin{bmatrix} cp & 0 & -sp \\ 0 & 1 & 0 \\ sp & 0 & cp \end{bmatrix} \begin{bmatrix} cy & sy & 0 \\ -sy & cy & 0 \\ 0 & 0 & 1 \end{bmatrix}$$

$$= \begin{bmatrix} cpsy & cpsy & -sp \\ srspcy - crsy & srspsy + crcy & srcp \\ crspcy + srsy & crspsy - srcy & crcp \end{bmatrix}$$

where cp=cos (pitch), sr=sin (roll), cy=cos(yaw), etc.

The matrix T is a function of three angles, roll, pitch and yaw. For most applications, only relatively small angular movements are possible. The roll, pitch and yaw angles can be derived by calculating only three of the matrix entries, (1,2), (1,3) and (2,3).

There are six possible transformation matrices corresponding to the permutations in the order of multiplication of Troll, Tpitch and Tyaw. In all cases, only three elements are needed to derive platform roll, pitch and yaw. The specific transformation used for a given application will depend on the INS and platform configuration.

At Step 8, the roll, pitch and yaw angles can not be calculated from the three entries (1,2), (1,3) and (2,3). It can be shown from the above matrix T that pitch angle=arcsin($-T_{13}$).

yaw angle=arcsin($T_{12}/(1-T_{13}^2)^{1/2}$)  (5)

roll angle=arcsin($T_{23}/(1-T_{13}^2)^{1/2}$)

These angles in (5) thus give the attitude of the platform relative to the frame due to the passive isolation mounts, i.e., the attitude of the platform in the global coordinate system. These angles can be thought of as an "offset", such that when these values are summed with the roll, pitch and yaw angles from the INS, the precise attitude of the camera line of sight is obtained. Thus, in an embodiment of the invention wherein the platform includes a camera, the data processor obtains from the inertial navigation system current information as to roll, pitch and yaw of the aircraft frame and sums the calculated yaw, pitch and roll angles from (5) with aircraft roll, pitch and yaw information derived from an inertial navigation system, thereby deriving the attitude of the platform in an inertial frame of reference, permitting precise pointing of the aerial reconnaissance camera. In other applications for the invention, the measurement of platform attitude relative to the fixed frame may be used for other purposes depending on the application, as discussed previously.

The foregoing procedure can be implemented in a mathematical analysis software known as MATLAB. The following code was used to verify the results and develop the alignment procedure. The initialization phase uses given fixed points and initial linear position sensor measurements. The initialization phase and real-time platform attitude measurement phases use the subroutines tetra.m for the law of cosines transformation, and vprod.m for the vector product calculation, which are given at the end of the program.

```
%
%
%       pam1.m
%
%
%starting points
    p1ag = (5. −7. 2.);
    p1bg = (3. −5. 2.);
    p1cg = (5. −5. 4.);
    p1a1 = (0 0 0);
    p1b1 = (sqrt(8.)0 0);
    p1c1 = (sqrt(2.) sqrt(6.) 0);
    p2ag = (−3. −5. 5.);
    p2bg = (−5. −7. 5.);
    p2cg = (−5.− 5. 7.);
    p2al = (0 0 0);
    p2bl = (sqrt(8.) 0 0);
    p2cl = (sqrt(2.) sqrt(6.) 0);
    p3ag = (−3. 5. 8.);
    p3bg = (−5. 3. 8.);
    p3cg = (−5. 5. 10.);
    p3al = (0 0 0);
    p3bl = (sqrt(8.) 0 0);
    p3cl = (sqrt(2.) sqrt(6.) 0);
% calculate the transform for the global points at the 3 mounts
% translation is pnag
% rotation: construct v1, v2, vn for local @ origin, invert, and mult
% by global construct. This leaves a transform matrix which will put
% pm into global coord.
    m1l = (p1al−p1bl; p1al−p1cl; vprod(p1al−p1bl,p1al−p1cl));
    m1g = (p1ag−p1bg; p1ag−p1cg; vprod(p1ag−p1bg,p1ag−p1cg));
    t1 = inv(m1l)*m1g          % local @ origin → global
    pitch = −1*asin(t1(1,3));
    yaw = asin(t1(1,2)/sqrt(1−t1(1,3)^2));
    roll = asin(t1(2,3)/sqrt(1−t1(1,3)^2));
    rpyt1 = (roll pitch yaw);   % local @ origin → global
    m2l = (p2al−p2bl; p2al−p2cl; vprod(p2al−p2bl,p2al−p2cl));
    m2g = (p2ag−p2bg; p2ag−p2cg; vprod(p2ag−p2bg,p2ag−p2cg));
```

```
t2 = inv(m2l)*m2g         % local @ origin → global
pitch = -1.*asin(t2(1,3));
yaw = asin(t2(1,2)/sqrt(1-t2(1,3) 2));
roll = asin(t2(2,3)/sqrt(1-t2(1,3) 2));
rpyt2 = (roll pitch yaw);
m3l = (p3al-p3bl; p3al-p3cl; vprod(p3al-p3bl,p3al-p3cl));
m3g = (p3ag-p3bg; p3ag-p3cg; vprod(p3ag-p3bg,p3ag-p3cg));
t3 = inv(m3l)*m3g         % local @ origin → global
pitch = -1.*asin(t3(1,3));
yaw = asin(t3(1,2)/sqrt(1-t3(1,3) 2));
roll = asin(t3(2,3)/sqrt(1-t3(1,3) 2));
rpyt3 = (roll pitch yaw);
% with camera locked in position all LPT's are midrange
% function (p) = tetra (x1,x2,y1,l1,l2,l3)
    pll = tetra (plcl(1),plbl(1),plcl(2),2.,2.,2.)
    p2l = tetra (p2cl(1),p2bl(1),p2cl(2),2.,2.,2.)
    p3l = tetra (p3cl(1),p3bl(1),p3cl(2),2.,2.,2.)
    plg = pll*t1 + plag
    p2g = p2l*t2 + p2ag
    p3g = p3l*t3 + p3ag
% use the current plg,p2g, and p3g to establish the reference
% matrix, r, from which all unlocked camera positions will be calculated.
    plref = plg;
    p2ref = p2g;
    p3ref = p3g;
    r = (plref-p2ref; plref-p3ref; vprod(plref-p2ref,plref-p3ref))
    inv(r)
% test procedure;
% take plref, p2ref, and p3ref, apply a RPYT transformation to them,
% calculate the lengths of the LPT's, and feed that to the PAM routine.
% The PAM routine should return the original RPY
% function (pp) = xform (p, rl, ph, yw, dx, dy, dz)
    roll = 0.020;
    pitch = -0.010;
    yaw = 0.005;
    dx = 0.0;
    dy = 0.0;
    dz = 0.0;
    plact = xform (plref, roll, pitch, yaw, dx, dy, dz);
    p2act = xform (p2ref, roll, pitch, yaw, dx, dy, dz);
    p3act = xform (p3ref, roll, pitch, yaw, dx, dy, dz);
% calc lengths
    l1a = norm (plact-plag);
    l1b = norm (plact-plbg);
    l1c = norm (plact-plcg);
    l2a = norm (p2act-p2ag);
    l2b = norm (p2act-p2bg);
    l2c = norm (p2act-p2cg);
    l3a = norm (p3act-p3ag);
    l3b = norm (p3act-p3bg);
    l3c = norm (p3act-p3cg);
% Begin realtime platform attitude measurement
% PAM routine, run at servo update rate in DSP
    pll = tetra (plcl(1),plbl(1),plcl(2),l1a,l1b,l1c)
    p2l = tetra (p2cl(1),p2bl(1),p2cl(2),l2a,l2b,l2c)
    p3l = tetra (p3cl(1),p3bl(1),p3cl(2),l3a,l3b,l3c)
    plg - pll*t1 + plag
    p2g = p2l*t2 + p2ag
    p3g = p3l*t3 + p3ag
    v = (plg-p2g; plg-p3g; vprod(plg-p2g,plg-p3g))
    t = inv(r)*v
% derive roll, pitch and yaw angles from t
    pit = -1*asin(t(1,3));
    yaw = asin(t(1,2)/sqrt(1-t(1,3) 2));
    rol = asin(t(2,3)/sqrt(1-t(1,3) 2));
    rpyt = (rol pit yaw)
%
%
%       tetra.m
%
%
function (p) = tetra (x1, x2, y1, l1, l2, l3)
% using law of cosines find p = (px, py, pz)
% given fixed points pa, pb, pc and 3 linear
% measurement l1, l2, l3 which measure the 3 dimensional
% euclidian distance from pa, pb, pc to the unknown point p
    px = 0.5*x2 + (l1 2 - l2 2)/(2.*x2);
    py = (l1 2 - l3 2 + x1 2 = y1²2 - 2.*x1*px)/(2.*y1);
    pz = sqrt (l1 2 - px 2 - py 2);
    p = (px py pz);
```

```
%
%
%       vprod.m
%
%
function (vp) = vprod (v1, v2)
% calculates the vector product between 2 1x3 vectors v 1xv2
    vp = ( v1(2)*v2(3) - v1(3)*v2(2) . . .
           v1(3)*v2(1) - v1(1)*v2(3) . . .
           v1(1)*v2(2) - v1(2)*v2(1) );
%
%
%       xform.m
%
%
function (pp) = xform (p, rl, ph, yw, dx, dy, dz)
% 3d coordinate trans of point = (x y z)
% z axis rotation yw YAW
% y axis rotation ph PITCH
% x axis rotation rl ROLL
% translation (dx dy dz)
% premult by point
%       (1x3)*(3x3)=(1x3)
    zrot8 = (   cos(yw)     sin(yw)     0
               -sin(yw)     cos(yw)     0
                0           0           1    );
    yrot8 = (   cos(ph)     0          -sin(ph)
                0           1           0
                sin(ph)     0           cos(ph) );
    xrot8 = (   1           0           0
                0           cos(rl)     sin(rl)
                0          -sin(rl)     cos(rl) );
    txyz = (dx dy dz);
    rot = xrot8 * yrot8 * zrot*;  %RPY
    pp = p*rot + txyz;
```

III. Alternative Embodiments of the Invention

It will be appreciated by those of ordinary skill in the art that other types of linear position sensors may be used to generate the movement signals in the manner previously described. The linear position sensor embodiment of FIG. 6 has ball ends that are placed in direct physical contact with the platform, and the geometry of the intersecting balls shown in FIG. 6 introduces a small amount of error (of perhaps a few thousandths of an inch) in the measurement of the position of point P1. The resultant root-mean-square angular error for due to this position error, taking all 9 sensors into account, may be of the order of a few hundred microradians. It may be preferable in certain applications to eliminate this error entirely by the use of noncontacting position sensors to make the measurements, such as by using Hall Effect sensors, proximity sensors, optical sensors, capacitative or inductive sensors, or other types of sensors that measure the translation of the point P1 along three axes. For example, a light source could be placed at point P1 and the intensity of the light measured at fixed points P1a, P1ba and P1c, the intensity of light being a function of the distance of the point P1 from the points P1a, P1b and P1c. The scope of the present invention is intended to cover such alternative constructions in which non-contact position sensors are used to measure the movement of the platform.

Figure 21:
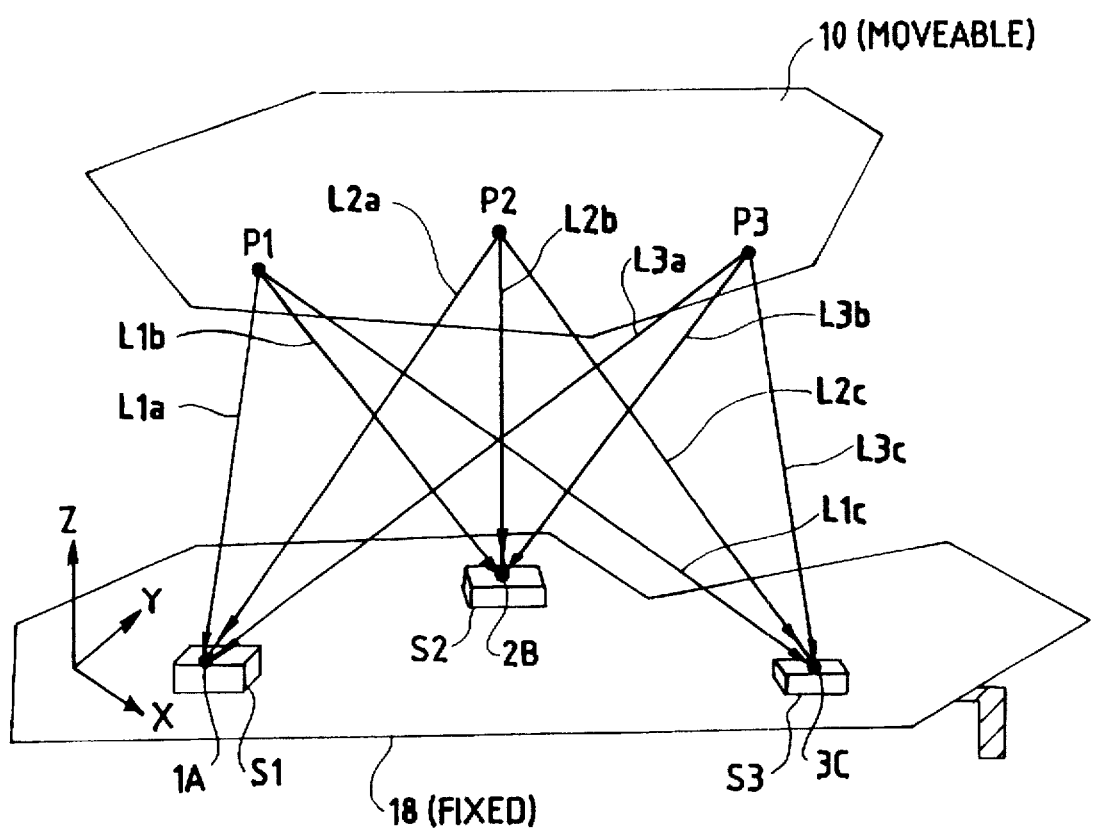
FIG. 21 is a schematic diagram of one possible non-contact position arrangement for the linear position sensor arrangement of FIG. 1.

A simplified schematic of a non-contact position sensor implementation is shown in FIG. 21. The movable body or platform 10 (such as a machine tool) moves with respect to the fixed body or frame 18 (such as a work piece) about three rotational axes X, Y and Z of the global coordinate system. In this example, the platform 10 is not mounted to the frame 18, but rather is free to move relative to the frame. An emitter (say, of light having a frequency $f_1$) is placed at movable point P1. Similarly, emitters are placed at the other two movable points P2 and P3 on the platform with frequencies $f_2$ and $f_3$. Suitable sensors S1, S2 and S3 are placed at the three fixed points 1A, 2B and 3C, respectively, on the frame 18. The measurement of the distance from points 1A to movable point P1 is made by sensor S1. Conventional technology used in range finding, radar, proximity sensor or autofocus camera technologies may be used for measuring the distances between the fixed and moveable points. The distance measurement function between points P1 and 1A is represented by L1a, as this distance measurement is analogous to the distance measurement made by the linear position sensor L1A of FIG. 1A. The set of distance measurements made by the three sensors and emitters shown in FIG. 21 gives the same data sets that are generated using the nine linear position sensors of FIG. 1A. These data sets, plus the known coordinates of the fixed points 1A, 1B and 1C, provide all the information that is needed to compute the attitude of the platform 10 relative the frame 18 in the global coordinate system X, Y, Z.

Figure 22:
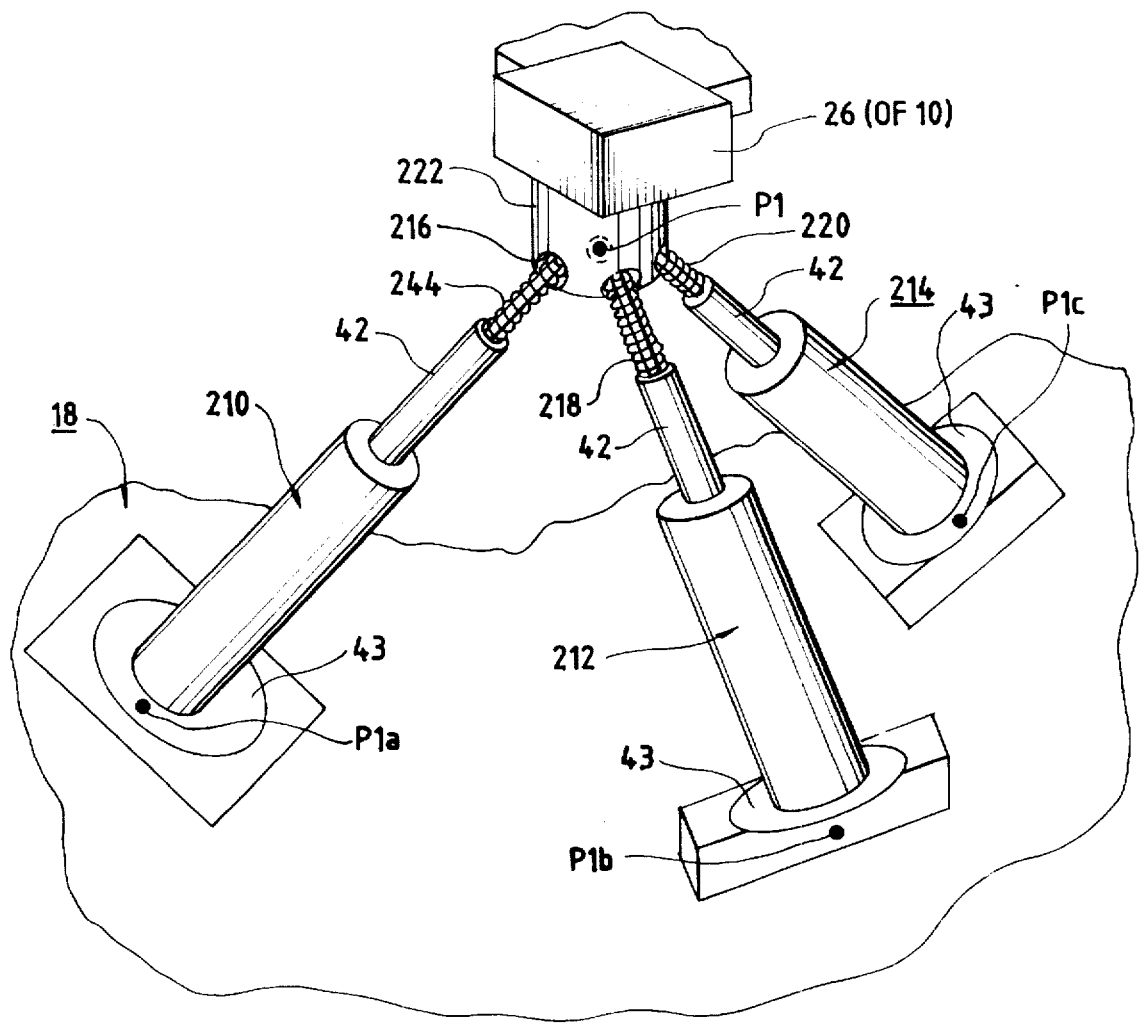
FIG. 22 is perspective view of an alternative construction for the linear position sensor arrangement of FIG. 3.
Figure 23:
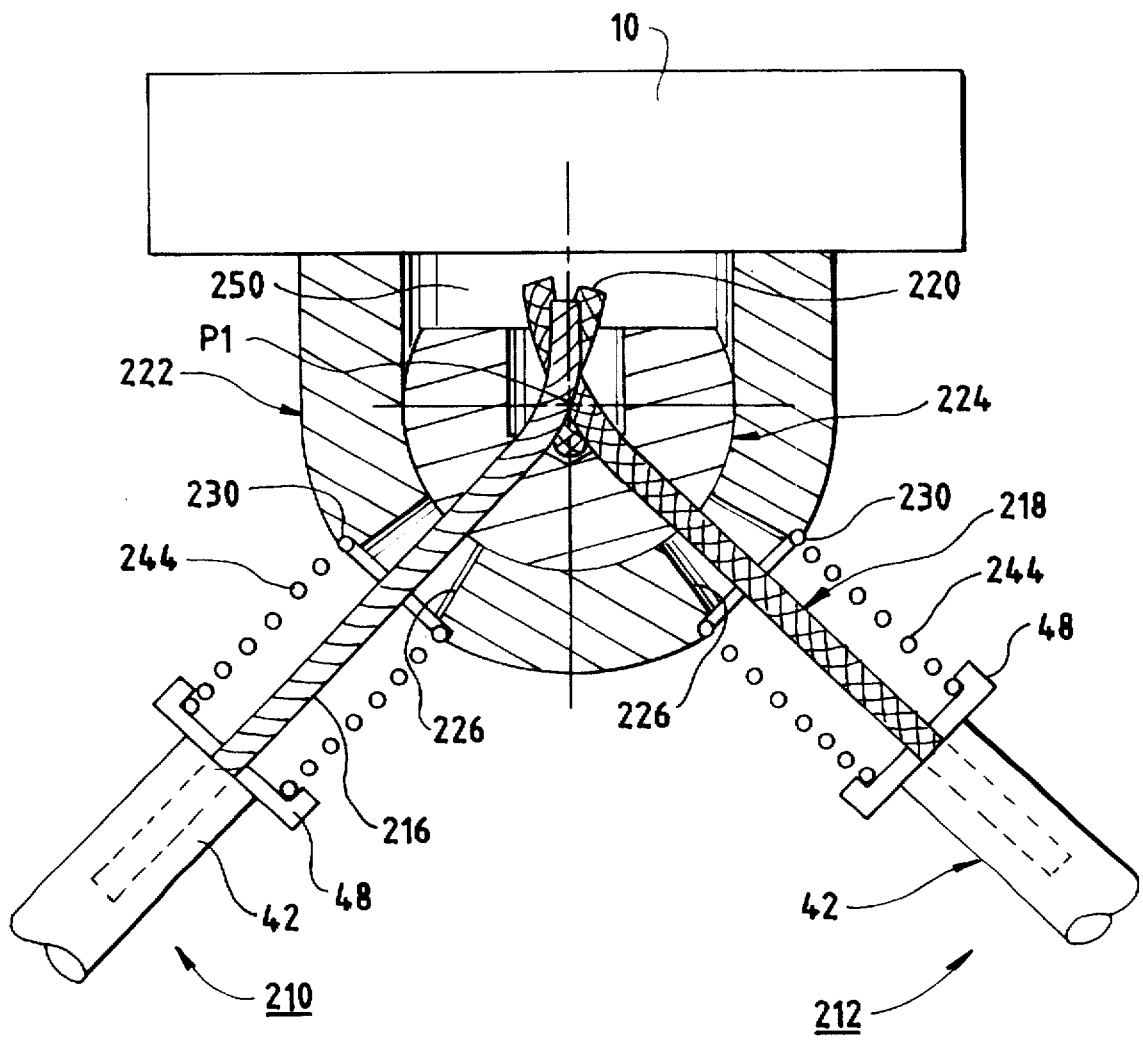
FIG. 23 is a detailed sectional view of the arrangement of FIG. 22, showing the intersection of the three flexible cables at the movable point Pi.

An alternative embodiment of a contact position sensor that eliminates errors in the measurement of distance from the fixed points to the movable points is shown in FIGS. 22 and 23. A set of three linear position sensors 210, 212 and 214 measure the movement of the movable point P1 in the platform 10. Linear position sensor 210 is associated with fixed point P1a, position sensor 212 is associated with fixed point P1b and position sensor 214 is associated with fixed point P1c. Points P1a, P1b and P1c are fixed with respect to the frame 18. The position sensors have a shaft or piston member 42 that is biased toward a pivot housing 222 by a cable tensioning spring 244. A flexible but non-stretchable steel cable 216 is provided having one end thereof embedded or otherwise affixed to the distal ends of the piston 42 and another end that is soldered or otherwise affixed to a brass pivot ball in the interior of the pivot housing 222. Linear position sensors 212 and 214 have similar cables 218, 220 respectively. Note also that the linear position sensors 210, 212 and 214 are not necessarily orthogonal with one another.

The intersection of the three cables 216, 218 and 220 within the pivot ball is shown in FIG. 23. The pivot housing 222 has an open interior 250 with a hemispherical bottom region in which the brass pivot ball 224 rests and is free to slide about as the platform 10 moves. The pivot housing 222 is provided with channels 226 through which the cables pass. The pivot housing 222 is also provided with recess portions 230. The springs 244 seat in the recessed portions 230, and bias the end portions 48 of the shafts 42 towards the pivot housing 222. As the pivot ball moves about in the interior 250 of the pivot housing 222, the cables 216, 218 and 220 pull the ends 48 of the shafts 42 back and forth. This movement is sensed by the linear position sensors and the resulting measurement signals are sampled by the digital signal processing equipment during the platform attitude calculation routine set forth above.

From the foregoing, it will be appreciated that many variations may be made from the specifics of the preferred and alternative embodiments of the invention without departure from the true spirit and scope of the invention. This true spirit and scope is defined by the appended claims, to be interpreted in light of the foregoing.

We claim:

1. A method of determining the attitude of a platform, said platform isolated from an airframe by at least one compliant mount, said platform installed in an aircraft having an inertial navigation system, comprising the steps of:

measuring the movement of said platform relative to the airframe along three axes at three separate locations;

calculating the roll, pitch and yaw angles of said platform relative to said airframe from said measurement of the movement of said platform relative to the airframe;

obtaining from the inertial navigation system current information as to roll, pitch and yaw of the aircraft; and summing said calculated yaw, pitch and roll angles with said aircraft roll, pitch and yaw information obtained from said inertial navigation system, thereby deriving the attitude of said platform in an inertial reference frame.

2. The method of claim 1, wherein said measurements of platform movement are made by first, second and third sets of three linear position sensors, said sets of linear position sensors located at three separate locations about said platform, said first, second and third sets of linear position sensors measuring the movement of first, second and third points, respectively located on said platform.

3. The method of claim 2, wherein each of said three linear position sensors of each of said sets comprise:

a first end connected to said airframe and a second end operatively connected to said platform, and wherein said second end of each of said sets of said three linear positions sensors meet about a point on said platform.

4. The method of claim 1, wherein said step of measuring the movement of the platform is performed by at least one non-contact linear position sensor.

5. The method of claim 1, wherein said step of calculating the roll, pitch and yaw angles comprises the step of:

calculating a reference matrix R of attitude values of said platform in an initial condition in a global coordinate system;

calculating an attitude matrix V of the platform relative to the global coordinate system from said measurement of platform movement relative to the airframe;

calculating at least three components of a transformation matrix T, whereby $$T = R^{-1} V$$

where $R^{-1}$ is the inverse of reference matrix R; and calculating said roll, pitch and yaw angles from said at least three components of said transformation matrix T.

6. The method of claim 1, wherein said platform further comprises an aerial reconaissance camera.

7. A mounting assembly for a platform attitude measurement system, the mounting assembly for mounting a platform to a frames comprising;

a compliant isolation mount for interconnecting said platform to said frame, said compliant isolation mount permitting said platform to move relative to said frame; and a set of three linear position sensors, said linear position sensors measuring the distance from a single fixed point on said platform to three fixed points on said frame along three axes and responsively generating measurement signals;

said linear position sensors sending said measurement signals to a data processor responsively calculating the attitude of said platform relative to said frame.

8. The mounting assembly of claim 7, wherein said platform further comprises an aerial reconnaissance camera.

9. A system for measuring the attitude of a platform relative to a frame, comprising:

at least three mounting assemblies, each of said mounting assemblies comprising (a) a compliant isolation mount interconnecting said platform to said frame, said compliant isolation mount permitting said platform to move relative to said frame, and (b) at least one set of three linear position sensors for measuring the distance from a single fixed point on said platform to three fixed points on said frame along three axes and responsively generating measurement signals; and a data processor receiving said measurement signals and responsively calculating the attitude of said platform relative to said frame.

10. The system of claim 9, wherein said data processor calculates said attitude of said platform relative to said frame by implementing a set of instructions stored on a computer data storage medium corresponding to the procedure described in FIGS. 20A and 20B.

11. A method of determining the attitude of a platform relative to a fixed frame, said platform moveable relative to said frame during an operational condition of said platform, comprising the steps of:

making measurements of the position of three points on said platform relative to said frame in an initial condition with said platform fixed with respect to said frame;

making measurements of the position of said three points on said platform relative to said frame during movement of said platform relative to said frame during said operational condition;

supplying said measurements of position during said initial condition and during said operational condition when said platform is moveable with respect to said frame to a data processor; and calculating with said data processor the roll, pitch and yaw angles of the platform attitude relative to said frame from said measurements of position during said operational condition and said measurements of the position in said initial condition.

12. The method of claim 11, wherein said measurements of the position during said operational condition are made by three sets of three linear position sensors.

13. The method of claim 12, wherein each of said three linear position sensors of each of said sets comprise a first end connected to said frame and a second end operatively connected to said platform, and wherein said second ends of said sets of said three linear positions sensors meet about a point on said platform.

14. The method of claim 11, wherein said measurements of the position during said operational condition include measuring at least one of said points on said platform by at least one non-contact position sensor.

15. The method of claim 11, wherein said step of calculating the roll, pitch and yaw angles comprises the steps of:

calculating, from said measurements of the position during said initial condition, a reference matrix R of attitude values of said platform in said initial condition in a global coordinate system;

calculating an attitude matrix V of the platform relative to the global coordinate system from said measurements of the position during said operational condition;

calculating at least three components of a transformation matrix T, whereby $T = R^{-1} V$, where $R^{-1}$ is the inverse of the reference matrix R; and calculating said roll, pitch and yaw angles from said at least three components of said transformation matrix T.

16. The method of one of claims 11–15, wherein said frame is isolated from said platform by at least one compliant mount.

17. The method of claim 11, wherein said data processor calculates the roll, pitch and yaw angles of the platform relative to said frame by executing a software program containing a set of instructions implementing the procedure described in FIGS. 20A and 20B.

18. The method of claim 11, wherein said platform further comprises an aerial reconnaissance camera.

* * * * *